(12) United States Patent
Himura et al.

(10) Patent No.: US 9,137,118 B2
(45) Date of Patent: Sep. 15, 2015

(54) MANAGEMENT SERVER AND MANAGEMENT METHOD

(71) Applicant: Hitachi, Ltd., Tokyo (JP)

(72) Inventors: Yosuke Himura, Tokyo (JP); Yoshiko Yasuda, Saitama (JP); Mariko Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 13/722,136

(22) Filed: Dec. 20, 2012

(65) Prior Publication Data

US 2014/0010109 A1 Jan. 9, 2014

(30) Foreign Application Priority Data

Feb. 27, 2012 (JP) ................. 2012-040257

(51) Int. Cl.
*H04L 12/24* (2006.01)

(52) U.S. Cl.
CPC ............ *H04L 41/12* (2013.01); *H04L 41/0853* (2013.01); *H04L 41/0213* (2013.01)

(58) Field of Classification Search
USPC ............ 370/254, 255, 256, 408, 252, 395.31
See application file for complete search history.

(56) References Cited

U.S. PATENT DOCUMENTS

| 6,085,238 | A * | 7/2000 | Yuasa et al. .................. 709/223 |
| 7,593,352 | B2 | 9/2009 | Verma |
| 7,668,106 | B2 * | 2/2010 | Ito et al. ..................... 370/241.1 |
| 2009/0207756 | A1 * | 8/2009 | Sakai et al. .................. 370/254 |
| 2014/0010109 | A1 * | 1/2014 | Himura et al. ............... 370/254 |

FOREIGN PATENT DOCUMENTS

JP 2009-194675 A 8/2009

OTHER PUBLICATIONS

U.S. Appl. No. 13/565,174, filed Aug. 2, 2012, Himura.

* cited by examiner

*Primary Examiner* — Benjamin H Elliott, IV
(74) *Attorney, Agent, or Firm* — Foley & Lardner LLP

(57) ABSTRACT

To identify a logical topology of each virtual network among logical topologies of a plurality of virtual networks configured in physical devices.

A management server includes a controller for managing logical topology information of all virtual networks each of which includes a plurality of virtual resources configured in a plurality of physical devices coupled to a network; wherein the controller: searches the logical topology of all the virtual networks from the entire virtual network based on the information of branch point resource which is a kind of virtual resource for mutually coupling the plurality of virtual networks and constitutes a branch point for each virtual network; extracts a series of virtual resources that terminates at the branch point resource; and identifies the series of extracted virtual resources as a partial topology, which eventually represents the topology of a virtual network inside the entire virtual network.

16 Claims, 32 Drawing Sheets

FIG. 3

| DEVICE ID | DEVICE TYPE | IP ADDRESS | USER NAME | PASSWORD | FILE NAME |
|---|---|---|---|---|---|
| SW-A | aaa | x.x.x.x | operator | ****** | A.txt |
| SW-B | aaa | y.y.y.y | admin | ****** | B.txt |
| FW-A | bbb | z.z.z.z | admin | ****** | C.txt |
| LB-A | ccc | w.w.w.w | admin | ****** | D.txt |
| | | | | | |

| NODE TYPE (401) | GENERATION PATTERN OF DEVICE TYPE AAA (402) | |
|---|---|---|
| N1 | vlan <id><br>:<br>! | 411 |
| N2 | interface vlan <id><br>:<br>  ip address x.x.x.x<br>:<br>! | 412 |
| N3 | vrf definition <id><br>:<br>! | 413 |

FIG. 5

| EDGE TYPE | CONNECTION NODE TYPE | CONNECTION PATTERN OF DEVICE TYPE AAA |
|---|---|---|
| E1 | N1, N2 | interface vlan <id><br>⋮<br>  ip address x.x.x.x<br>⋮<br>! |
| E2 | N2, N3 | interface vlan <id1><br>⋮<br>  vrf forwarding <id2><br>⋮<br>! |
| E3 | N3, N3 | route-map <name><br>⋮<br>  match vrf <id1><br>⋮<br>!<br>⋮<br>vrf definition <id2><br>⋮<br>  import inter-vrf <name><br>⋮<br>! |

FIG.6

| NODE ID | NODE TYPE | DEVICE ID | INTRA-TYPE ID |
|---------|-----------|-----------|---------------|
| 1 | N1 | – | 10 |
| 2 | N2 | SW1 | 10 |
| 3 | N3 | FW1 | 1 |
| 4 | N1 | – | 20 |
| | | | |

FIG.7

| EDGE ID | EDGE TYPE | NODE ID | NODE ID | |
|---|---|---|---|---|
| 1 | E1 | n1 | n2 | ～711 |
| 2 | E2 | n3 | n5 | ～712 |
|  |  |  |  | ～713 |

|  | TENANT 1 (3201) | TENANT 2 (3202) | TENANT 3 (3203) | ... |
|---|---|---|---|---|
| TENANT 1 (3101) | 0 | 3 | 4 | ... |
| TENANT 2 (3102) | 3 | 0 | 1 | ... |
| TENANT 3 (3103) | 4 | 1 | 0 | ... |
| : | : | : | : | |

FIG. 32

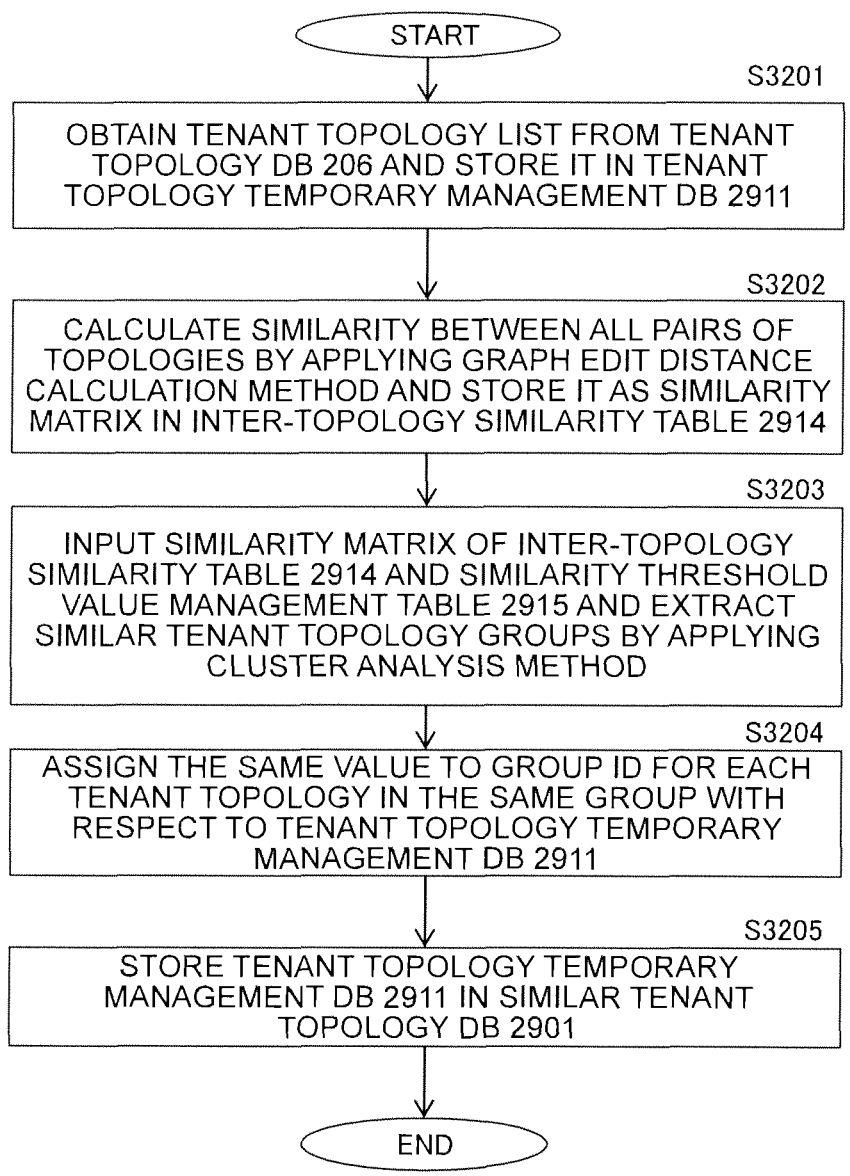

```
                    START
                      ↓              S3201
    OBTAIN TENANT TOPOLOGY LIST FROM TENANT
     TOPOLOGY DB 206 AND STORE IT IN TENANT
     TOPOLOGY TEMPORARY MANAGEMENT DB 2911
                      ↓              S3202
     CALCULATE SIMILARITY BETWEEN ALL PAIRS OF
      TOPOLOGIES BY APPLYING GRAPH EDIT DISTANCE
      CALCULATION METHOD AND STORE IT AS SIMILARITY
      MATRIX IN INTER-TOPOLOGY SIMILARITY TABLE 2914
                      ↓              S3203
       INPUT SIMILARITY MATRIX OF INTER-TOPOLOGY
     SIMILARITY TABLE 2914 AND SIMILARITY THRESHOLD
        VALUE MANAGEMENT TABLE 2915 AND EXTRACT
     SIMILAR TENANT TOPOLOGY GROUPS BY APPLYING
             CLUSTER ANALYSIS METHOD
                      ↓              S3204
    ASSIGN THE SAME VALUE TO GROUP ID FOR EACH
     TENANT TOPOLOGY IN THE SAME GROUP WITH
      RESPECT TO TENANT TOPOLOGY TEMPORARY
              MANAGEMENT DB 2911
                      ↓              S3205
        STORE TENANT TOPOLOGY TEMPORARY
     MANAGEMENT DB 2911 IN SIMILAR TENANT
              TOPOLOGY DB 2901
                      ↓
                     END
```

MANAGEMENT SERVER AND MANAGEMENT METHOD

INCORPORATION BY REFERENCE

This application claims priority based on Japanese patent application, No. 2012-040257 filed on Feb. 27, 2012, the entire contents of which are incorporated herein by reference.

BACKGROUND

The disclosed subject matter relates to a management server and management method for automatically generating tenant topology information constructed by using a plurality of virtualization techniques.

A multi-tenant system has been becoming widespread as an effective means of a cost reduction for computer networking. The multi-tenant means a system for virtualizing and aggregating a plurality of tenants (information systems) in a single physical infrastructure (physical device group). As the plurality of tenants actually share physical devices and also use various network virtualization techniques, it is possible to have the individual tenants recognize as if they are using a dedicated device group.

The tenants can now take a flexible and complicated network configuration because of the development of the network virtualization techniques in recent years. The network virtualization techniques include virtualization techniques for an L2 (Layer 2) layer and virtualization techniques for an L3 (Layer 3) layer. The L2 layer virtualization techniques include virtual LAN (Local Area Network) techniques such as a VLAN (IEEE802.1Q Virtual Local Area Network); and the L3 layer virtualization techniques include virtual router techniques such as VRF (Virtual Routing and Forwarding) and VR (Virtual Router). Furthermore, virtual interface techniques such as VLAN interfaces and sub-interfaces are also included as techniques for linking the L2 techniques and the L3 techniques. A tenant network is constructed by combining such virtualization techniques.

A virtual network of tenants having various configurations can now be constructed in a single physical infrastructure in, for example, a datacenter network by making full use of the virtualization techniques like those described above. The configurations of tenants include a configuration constituted from a single L2 network segment and a configuration in which a plurality of L2 networks are mutually coupled at an L3 level by using a virtual router, a firewall, and a load balancer.

In a sense, each virtual network for a tenant is a different subset of the entire (or overall) virtual network. Virtual networks for tenants are terminated by, for example, a router serving as a gateway to an external network and provide various services to the external network. As another example, virtual networks for tenants are terminated by a VPN (Virtual Private Network) device, are connected to clients outside the datacenter via the VPN, and are used for internal usage such as scientific calculation.

On the other hand, since many tenants having various configurations have come to coexist in a single physical infrastructure, it has become difficult to understand logical configurations (tenant topologies) of the tenants and an operation cost has been increasing. To understand the individual tenant topologies is a basic work in operation management services and is necessary, for example, when adding a new tenant, changing, deleting, designing, verifying, or monitoring the configuration of the existing tenant(s), or dealing with a failure(s).

Conventional methods used to understand tenant topologies and their problems are as follows. A first method is to manually manage and understand tenant topology diagrams by using documents and the like. The problem of this method is that information described in the documents does not necessarily match the content that is actually set to devices. Also, another problem is that management of each tenant by drawing a topology diagram for each tenant one by one itself is complicated work and human errors tend to easily occur.

A second method is to interpret the information of device settings by means of manual work and understand logical tenant topologies. However, since a large number of items are set to the devices on a complicated virtual network as explained earlier, the problems of this method are that: there is a high possibility that the configuration cannot be accurately acquired due to human errors; and it takes an enormous amount of time to acquire the tenant topologies.

In order to solve the problems of the conventional methods, it is an object to automatically analyze setting information (config) of the devices and automatically generate one or more pieces of tenant topology information. If the setting information of the devices can be analyzed, the tenant topologies can be acquired; and human errors can be reduced and work time can also be reduced by automating this analysis.

In relation to this object, there is a conventional technique that automatically generates logical topology information in a virtual network. For example, according to Japanese Patent Application Laid-Open (Kokai) Publication No. 2009-194675, VLAN topology information (VLAN is an L2 virtualization technique) is automatically generated. This technique generates logical connection relationship information of physical devices in a network composed of a plurality of VLANs by using setting information about VLAN interfaces from config information that is set to the devices in a network environment composed of switches and routers.

According to U.S. Pat. No. 7,593,352, an information exchange relationship between virtual routers is automatically generated as an example of the L3 virtualization techniques. This technique is used for VPN services of an MPLS (Multi Protocol Label Switching) network in a carrier network. If this technique is used, a path exchange relationship between virtual routers at each of client sites can be acquired based on setting information of the VRF of the MPLS router.

SUMMARY

The problem of these conventional techniques is that the logical topology information of individual virtual networks cannot be generated in the network environment where virtual networks of a plurality of tenants are constructed by using a plurality of virtualization techniques.

Specifically, the technique disclosed by Japanese Patent Application Laid-Open (Kokai) Publication No. 2009-194675 is a technique to identify a logical connection relationship of physical devices; and in the environment where virtual networks of a plurality of tenants share the physical devices, the tenant topologies cannot be identified individually even if this technique is directly applied. Furthermore, in the environment where target devices are only switches or routers that realize the VLAN and the virtual router techniques are used, the problem is that logical topologies of the virtual networks cannot be acquired accurately. Furthermore, detailed information that should be retained in a generation program for generating the logical topologies is not disclosed.

Regarding the technique disclosed by U.S. Pat. No. 7,593,352, its target devices are only routers for realizing the VPN by MPLS of a carrier network; and although this technique can identify the connection relationship between virtual routers, it cannot generate topology information about a virtual LAN. The virtual LAN is a commonly used technique in office networks and datacenter networks, but the problem is that this technique cannot acquire the logical topologies or acquire tenant-based topologies. Furthermore, in the aforementioned network environment unlike a carrier network VPN, there is a possibility that the tenant topologies may be mutually coupled at positions such as gateways and are not completely separated from each other. Even if this disclosed technique is applied in this case, a problem of false recognition of the plurality of mutually coupled tenant topologies as one topology may occur.

Therefore, Japanese Patent Application Laid-Open (Kokai) Publication No. 2009-194675 and U.S. Pat. No. 7,593,352 have the problem of incapability to accurately generate the tenant topology information in the complicated multi-tenant environment configured by combining virtual LANs, virtual interfaces, and the virtual router techniques.

As compared to a case where a single virtualization technique is used, information to be managed and information to be associated with are complicated with respect to a virtual network using a plurality of virtualization techniques and the above-described problem cannot be solved easily by simple extension of the conventional technology. Furthermore, since the tenant topologies are not completely independent and may possibly be partially coupled to each other as mentioned above, a system for identifying the individual tenant topologies is not obvious and cannot be achieved easily.

This specification discloses a management server and management method capable of identifying a logical topology of each virtual network among logical topologies of a plurality of virtual networks constituting the overall virtual network including a plurality of virtual resources virtually constructed in physical devices coupled to a physical network.

The disclosed management server and management method includes: a storage device storing logical topology information of a plurality of virtual networks including a plurality of virtual resources virtually constructed in a plurality of physical devices coupled to a network, which is logical topology information of all the virtual networks; and a controller for managing the logical topology information of all the virtual networks; wherein the controller judges, based on the logical topology information of all the virtual networks, whether or not a branch point resource (which is a virtual resource for mutually coupling the plurality of virtual networks and constitutes a branch point for each virtual network) exists in the virtual resources of the virtual networks; and if it is determined as a judgment result that the branch point resource exists, the controller searches the logical topology information of all the virtual networks, extracts a series of virtual resources that terminates at the branch point resource, and identifies the series of extracted virtual resources as a partial topology or one virtual network.

Furthermore, if the branch point resource is known, the controller: searches the logical topology information of all the virtual networks based on the branch point resource which is a virtual resource for mutually coupling the plurality of virtual networks and constitutes a branch point of each virtual network; extracts a series of virtual resources that terminates at the branch point resource; and identifies the series of extracted virtual resources as a partial topology or one virtual network.

Furthermore, when displaying information on a display device in accordance with an instruction from the controller, the controller: searches the logical topology information of all the virtual networks based on the branch point resource which is a virtual resource for mutually coupling the plurality of virtual networks and constitutes a branch point of each virtual network; extracts a series of virtual resources that terminates at the branch point resource; identifies the series of extracted virtual resources as a partial topology; issues an instruction to the display device to display information about the identified partial topology; and issues an instruction to the display device to not display information indicating a correspondence relationship between the physical devices and the plurality of virtual networks.

The above-described aspects can be applied to, for example, an information processing system constructed by using virtualization techniques.

According to the disclosed content, a logical topology of each virtual network can be identified among logical topologies of a plurality of virtual networks including a plurality of virtual resources virtually constructed in the physical devices.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example of the structure of a network device management table.

FIG. 4 shows an example of the structure of a node pattern management table.

FIG. 5 shows an example of the structure of an edge pattern management table.

FIG. 6 shows an example of the structure of a node management table.

FIG. 7 shows an example of the structure of an edge management table.

FIG. 31 shows an example of the structure of an inter-topology similarity table.

FIG. 32 is an example of a flowchart for explaining similar tenant topology identification processing.

DETAILED DESCRIPTION OF THE EMBODIMENTS

First Embodiment

A first embodiment will be explained by referring to an example of tenant topology generation in a network system at a datacenter. Incidentally, the datacenter network is just one form of application of this embodiment and other applications of this embodiment include, for example, a network across a plurality of datacenters, a carrier network, an office network, or a campus network.

Figure 1:
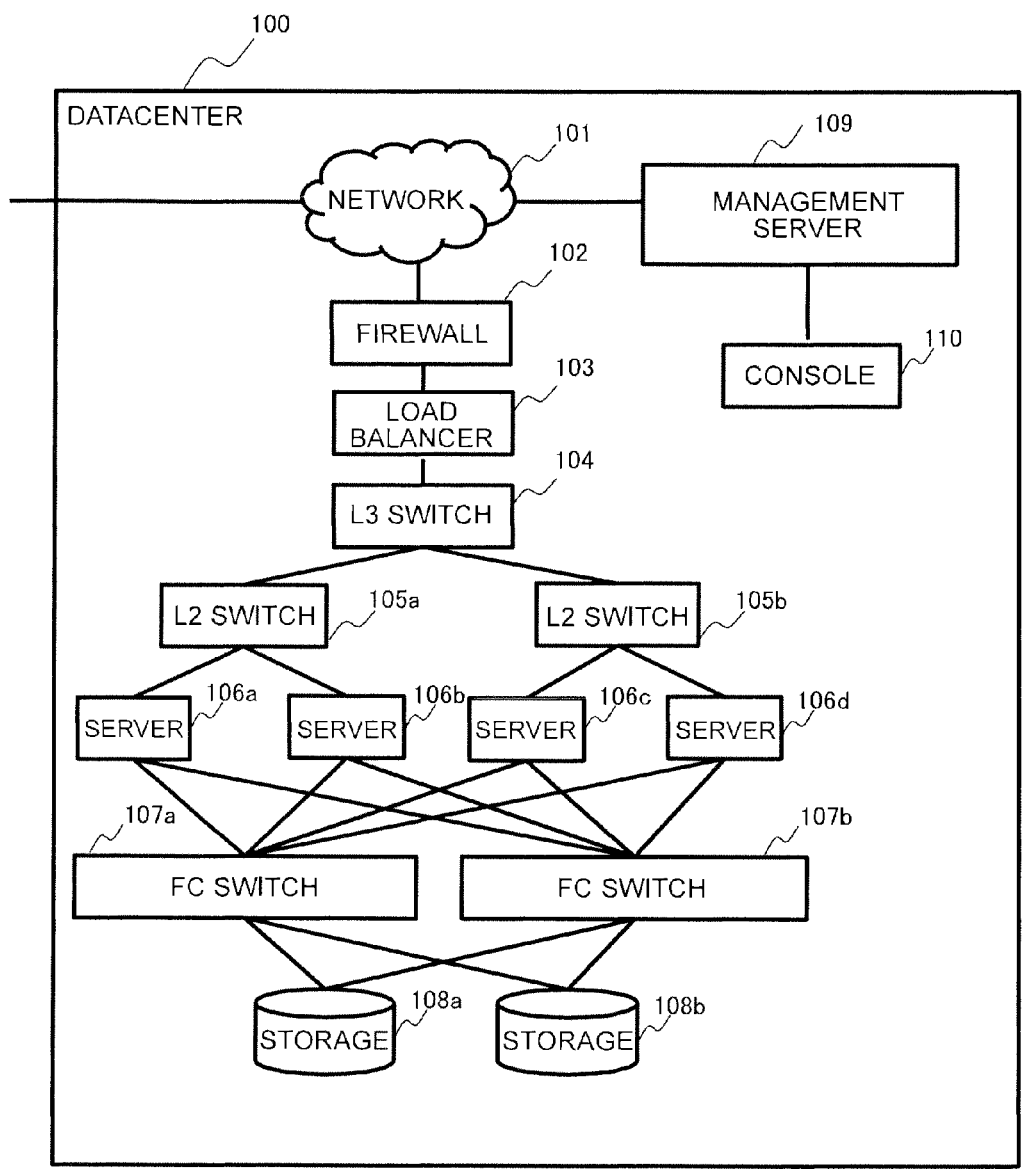
FIG. 1 shows an example of a system configuration of a datacenter according to a first embodiment.

FIG. 1 is a system configuration diagram of a datacenter according to the first embodiment. Referring to FIG. 1, a datacenter 100 constitutes a system for providing appropriate ICT (Information and Communication Technology) services via a network 101. Devices that could be components of that system include, in addition to network devices such as a firewall 102, a load balancer 103, an L3 switch 104, and L2 switches 105a, 105b, server devices such as servers 106a, 106b, 106c, 106d, SAN (Storage Area Network) switch devices such as FC (Fibre Channel) switches 107a, 107b, and storage devices such as storage devices 108a, 108b. Incidentally, it is unnecessary to configure the system by using all these devices and the system for providing appropriate ICT services may be configured by using only an appropriate number of appropriate types of devices. Furthermore, a management server 109 is coupled to this system. The management server 109 is coupled to a console 110.

The network devices such as the firewall 102, the load balancer 103, the L3 switch 104, and the L2 switches 105a, 105b constitute a LAN (Local Area Network), provide network connectivity to the servers 106a to 106d, and control packets sent and received by the servers. These network devices are coupled to the servers and may be further coupled to the management server 109 and an external network of the datacenter 100. Protocols for intra-LAN communications include Ethernet (registered trademark) and protocols for inter-LAN communications include IP (Internet Protocol). Then, these network devices have virtual LAN techniques such as IEEE802.1Q VLAN, virtual interface techniques such as VLAN interfaces and sub-interfaces, and virtual router techniques such as VRF and VR and constitute a virtual network(s) on a physical network. These network devices may be implemented as virtual machines (virtual appliances) by the virtualization technique of the servers 106a to 106d described later.

The server devices such as the servers 106a to 106d execute applications to perform appropriate ICT services. These server devices are coupled to each other via the aforementioned network device(s) and are further coupled to devices outside the datacenter 100. Furthermore, the server devices access the storage devices 108a, 108b via the FC switches 107a, 107b as described later. Each of the server devices is equipped with an NIC (Network Interface Card), an HBA (Host Bus Adapter), or a CNA (Converged Network Adapter) and accesses a LAN and a SAN. A plurality of virtual servers (VM) may be generated in the server devices by a VMM (Virtual Machine Monitor) technique or an LPAR (Logical Partitioning) technique. In this case, a VM generates a vNIC (Virtual Network Interface Card), vHBA (Virtual Host Bus Adaptor), and a virtual CNA which are virtual interfaces; and the VM accesses the network devices or the storage devices via these virtual interfaces.

The SAN switch devices such as the FC switches 107a, 107b constitute a SAN and transfer an I/O (Input/Output) request from the servers 106a to 106d to the storage devices 108a, 108b and transfer I/O data, which has been read from the storage device 108, to the servers 106a to 106d. Protocols for intra-SAN communications and inter-SAN communications include FC, FCIP (FC over IP), FCoE (FC over Ethernet), and iSCSI (Internet Small Computer System Interface). Furthermore, these SAN switch devices are equipped with virtualization techniques such as Zoning, NPIV (N Port_ID Virtualization), and VSAN (Virtual Storage Area Networking). Incidentally, they may be equipped with other virtualization techniques.

The storage devices such as the storage devices 108a, 108b provide external storage areas to the servers 106a to 106d via the aforementioned SAN. The storage device 108 includes an NPIV for virtualizing physical ports to access the storage device and LUs (Logical Units) that are logical volumes configured in the physical storage device. The storage device 108 may be equipped with functions such as LUN (Logical Unit Number) masking to associate storage ports with LUs and the servers.

The management server 109 collects setting information retained by each device in the system (hereinafter sometimes referred to as the config) and generates logical topology information of all or some of the virtual networks constructed from a plurality of devices in the datacenter 100 by using the collected setting information. The management server 109 visualizes the generated logical topology information and displays it on a screen of the console 110.

Incidentally, the functions of the constituent devices of the above-mentioned system (such as the firewall and the load balancer) may be provided by hardware or by software.

Figure 2:
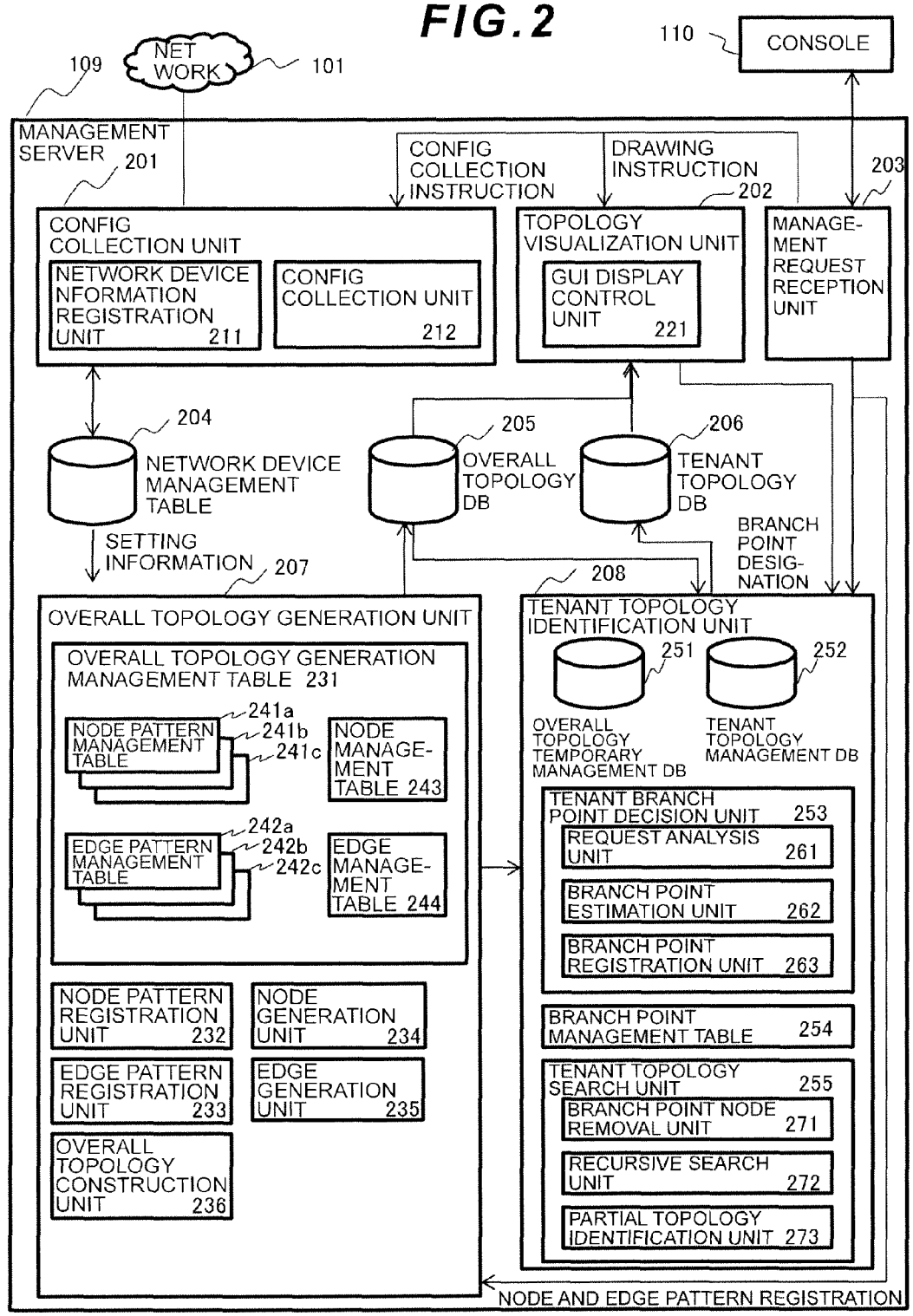
FIG. 2 shows an example of the configuration of a management server according to the first embodiment.

FIG. 2 is a configuration diagram showing an example of the configuration of the management server 109. Referring to FIG. 2, the management server 109 includes, as its components, a config collection unit 201, a topology visualization unit 202, a management request reception unit 203, a network device management table 204, an overall topology DB 205, a tenant topology DB (DataBase) 206, an overall topology generation unit 207, and a tenant topology identification unit 208.

The config collection unit 201 collects the setting information (config) of the devices from the network devices in the datacenter 100. Components of the config collection unit 201 include a network device information registration unit 211 and a config collection unit 212. The network device information registration unit 211 adds or deletes information, which is necessary to collect the config from the network devices in the datacenter 100, to or from the network device management table 204 described later.

The config collection unit 212 refers to network device information of the network device management table 204 and collects the config of the devices from each network device in the datacenter 100. The collected config is stored, for example, as config files in the management server 109. For example, the config files are stored in the storage device (not shown) and a file name list of the stored config files is retained in the network device management table 204. Incidentally, this config collection unit 212 is not mandatory and other methods may be used as long as the management server 109 can analyze the config. For example, an administrator may collect the config manually and store it as config files in the management server 109.

The topology visualization unit 202 visualizes overall topology information in the overall topology DB 205 or tenant topology information in the tenant topology DB 206 and outputs the logical topology on a GUI (Graphical User Interface) screen by using a GUI display control unit 221.

The GUI display control unit 221 controls a logical topology display method for displaying the logical topology on the GUI screen based on input by an operator. An implementation example will be explained with reference to FIG. 23.

The management request reception unit 203 accepts a processing request for generation of the logical topology information from the operator and issues a command to each function unit to execute the processing. The processing requested by the operator is, for example, collection of the config, generation of the logical topology information based on the collected config, and visualization of the generated logical topology. In this example, the function units to deal with each process of the above-listed processing are the config collection unit 201, the overall topology generation unit 207, and the topology visualization unit 202.

Furthermore, other processing requested by the operator includes, for example, registration of node patterns and edge patterns. If registration of the node patterns and the edge patterns is requested, the node pattern registration unit 232 or the edge pattern registration unit 233 is called via the overall topology generation unit 207. Alternatively, the processing requested by the operator may be, for example, express designation of a tenant branch point resource described later; and in this case, the tenant topology identification unit 208 is called.

The network device management table 204 retains necessary information to collect the config from the network devices. That information includes, for example, an ID of the relevant device, its device type, its IP address, its login name, and its password. The details of the network device management table 204 will be explained with reference to FIG. 3.

The generated topology DB 205 retains the overall topology information generated by the overall topology generation unit 207. Its details will be explained with reference to FIG. 10.

The tenant topology DB 206 retains the tenant topology information generated by the tenant topology identification unit 208. Its details will be explained with reference to FIG. 11.

The overall topology generation unit 207 analyzes the config collected by the config collection unit 201, generates the logical topology information of all the virtual networks as a graph structure composed of nodes (virtual resources such as virtual LANs and virtual interfaces) and edges (logical connections between the virtual resources), and stores information of the generated graph structure in the overall topology DB 205.

The overall topology generation unit 207 includes, as its components, an overall topology generation and management table 231, a node pattern registration unit 232, an edge pattern registration unit 233, a node generation unit 234, an edge generation unit 235, and an overall topology construction unit 236.

The overall topology generation and management table 231 is to manage information for generating nodes and edges from the config and manages the generated nodes and edges and includes one or more node pattern management tables 241$a$, 241$b$, 241$c$, one or more edge pattern management tables 242$a$, 242$b$, 242$c$, a node management table 243, and an edge management table 244. When the overall topology generation unit 207 generates nodes from the config, it refers to the node pattern management tables 241$a$ to 241$c$; and when the overall topology generation unit 207 generates edges, it refers to the edge pattern management tables 242$a$ to 242$c$. The generated nodes and edges are stored in the node management table 243 and the edge management table 244, respectively.

The node pattern registration unit 232 registers node patterns of the config in the node pattern management table 241. For example, when a device of a new device type is introduced to the datacenter, the administrator newly inputs a node pattern corresponding to this device. The newly input node pattern is input to the node pattern registration unit 232 via the management request reception unit 203 and the overall topology generation unit 207. The node pattern registration unit 232 generates this new node pattern as a new node pattern management table 241$d$.

Incidentally, the node pattern is a creation pattern of a generation command indicating virtual resource generation of various virtualization techniques in the config. The creation pattern of the generation command will be hereinafter referred to as the generation pattern. The details of the generation pattern will be explained with referent to FIG. 4.

Furthermore, the aforementioned virtual resource is a virtual instance generated by the virtualization technique and means an instance which becomes a constituent element of the logical topology of the virtual networks. The virtual resource includes, for example, an instance of the virtual LAN, an instance of the virtual interface, and an instance of the virtual router.

The edge pattern registration unit 233 registers edge patterns of the config in the edge pattern management table 242. For example, when a device of a new device type is introduced to the datacenter, the user newly inputs an edge pattern corresponding to this device. The newly input edge pattern is input to the edge pattern registration unit 233 via the management request reception unit 203 and the overall topology generation unit 207 and the node pattern registration unit 232 generates this new edge pattern as a new edge pattern management table 242$d$.

Incidentally, the edge pattern is a pattern of a setting command indicating a connection between virtual resources of various virtualization techniques in the config. The setting pattern of the connection command will be hereinafter referred to as the connection pattern. The details of this connection pattern will be explained with reference to FIG. 5.

Furthermore, the connection between the virtual resources means a logical connection between the aforementioned virtual resources constituting the logical topology. The connection between the virtual resources includes, for example, a connection between a VLAN and a VLAN interface and a connection between a VLAN interface and a VRF.

The node generation unit 234 extracts a command corresponding to generation of a virtual resource from the config of the devices based on the node pattern management table 241 and generates a node corresponding to the above-mentioned virtual resource based on information including the extracted command. The generated node is stored in the node management table 243. The details of the node generation unit 234 will be explained with reference to FIG. 8.

The edge generation unit 235 extracts a command corresponding to a connection between the virtual resources from the config of the devices based on the edge pattern management table 242 and generates an edge corresponding to the above-mentioned connection between the virtual resources based on information including the extracted command. The generated edge is stored in the edge management table 244. The details of the edge generation unit 235 will be explained with reference to FIG. 9.

The overall topology construction unit 236 generates the logical topology information of all the virtual networks at the datacenter 100 based on the content of the node management table 243 and the edge management table 244 and store it in the overall topology DB 205. The format of the topology information to be stored in this DB may be of any appropriate format such as an adjacency matrix, an incidence matrix, an adjacency list, or an incidence list. In this embodiment, the adjacency list format is used.

The node pattern management tables 241a to 241c retain creation patterns indicating generation of the virtual resources of various virtualization techniques in the config by associating them with the node types. Examples of generation of the virtual resources include generation of a new instance of a virtual interface and generation of a new instance of a virtual router. Incidentally, these tables are prepared for each device type of the devices. For example, the node pattern of device type aaa is 241a. The details of the node pattern management table 241a will be explained with reference to FIG. 4.

The edge pattern management tables 242a to 242c retain connection patterns indicating connections between the virtual resources of the various virtualization techniques in the config. Examples of connections between the virtual resources include a logical connection between an instance of a virtual LAN and an instance of a virtual interface and a logical connection between an instance of a virtual interface and an instance of a virtual router. This table is prepared for each device type of the devices. For example, the edge pattern of the device type aaa is 242a. The details of the edge pattern management table 242a will be explained with reference to FIG. 5.

The node management table 243 is a table for managing nodes generated from the config. The details of the node management table 243 will be explained with reference to FIG. 6.

The edge management table 244 is a table for managing edges generated from the config. The details of the edge management table 244 will be explained with reference to FIG. 7.

The tenant topology identification unit 208 receives input of the logical topology information of all the virtual networks, which is retained in the overall topology DB 205, identifies individual tenant topologies, and stores them in the tenant topology DB 206. The format of the topology information to be stored in this DB may be of any appropriate format such as an adjacency matrix, an incidence matrix, an adjacency list, or an incidence list; however, it is necessary to be capable of identifying the topology information on a tenant basis.

The tenant topology identification unit 208 includes, as its components, an overall topology temporary management DB 251, a tenant topology management DB 252, a tenant branch point decision unit 253, a branch point management table 254, and a tenant topology search unit 255.

The overall topology temporary management DB 251 is a DB for temporarily managing the overall logical topology. Its basic structure is the same as that of the overall topology DB 205.

The tenant topology management table 252 is a DB for retaining a specified tenant topology from among the overall topology. Its basic structure is the same as that of the tenant topology DB 206.

The tenant branch point decision unit 253 judges whether or not there is a virtual resource which couples a plurality of tenant topologies inside the overall topology and hence which is a branch point of each virtual network (hereinafter sometimes referred to as the branch point resource); and if the branch point resource exists, the tenant branch point decision unit 253 identifies its one or more branch point resources.

The branch point management table 254 is a table for retaining branch point resource information. Its details will be explained with reference to FIG. 12.

The tenant topology search unit 255 executes processing for identifying a tenant topology of an individual tenant based on the branch point resource information retained in the branch point management table 254 and stores the identified tenant topology in the tenant topology management table 252. After the entire tenant topology identification processing terminates, the tenant topology search unit 255 outputs the tenant topology to the tenant topology DB 206.

The tenant branch point decision unit 253 includes a request analysis unit 261, a branch point estimation unit 262, and a branch point registration unit 263.

When the branch point resource information is designated via the console 110, the request analysis unit 261 receives this branch point resource designation request and identifies a virtual resource corresponding to the designated branch point resource from the overall topology temporary management DB 251.

The branch point estimation unit 262 judges whether the branch point resource exists in the overall topology or not; and if the branch point resource exists, the branch point estimation unit 262 identifies its one or more branch point resources.

The branch point registration unit 263 registers the branch point resource(s), which was identified by the request analysis unit 261 and the branch point estimation unit 262, in the branch point management table 254.

The tenant topology search unit 255 includes a branch point node removal unit 271, a recursive search unit 272, and a partial topology identification unit 273.

The branch point node removal unit 271 removes the branch point resource(s), which is retained in the branch point management table 254, from the overall topology temporary management DB 251.

The recursive search unit 272 sets an arbitrary virtual resource as a search origin and recursively searches adjacent resources in order to identify a partial topology corresponding to the tenant topology from the overall topology temporary management DB 251.

The partial topology identification unit 273 stores a partial topology, which is constituted from a series of virtual resources searched by the recursive search unit 272, as a tenant topology in the tenant topology management DB 252.

FIG. 3 is an example of the structure of the network device management table 204. Referring to FIG. 3, the network device management table 204 manages information used when collecting the config from the network devices in the datacenter 100. The information to be managed in this table includes a device ID 301, a device type 302, an IP address 303, a user name 304, a password 305, and a file name 306 of the config. The device ID 301 is an ID for uniquely identifying an individual network device in all the networks. The device type 302, the IP address 303, the user name 304, and the password 305 are necessary information to remotely log into the relevant network device and collect the config. The file name 306 is a file name used to store the collected config. The network device management table 204 may also retain other information as the need arises.

FIG. 4 shows an example of the structure of the node pattern management table 241a. Referring to FIG. 4, the node pattern management table 241a manages association between the node type 401 and the creation pattern (generation pattern) 402 related to the generation of a virtual resource with respect to the device type aaa.

The node type represents the type of a virtual resource. For example, node N1 represents a virtual resource related to a virtual LAN, node N2 represents a virtual resource related to a virtual interface, and node N3 represents a virtual resource related to a virtual router.

For example, a generation pattern 411 is a setting pattern related to the generation of a virtual resource of a VLAN (node N1) which is one of the virtual LAN techniques; a generation pattern 412 is a setting pattern related to the generation of a virtual resource of a VLAN interface (node N2) which is one of the virtual interface techniques; and a generation pattern 413 is a setting pattern related to the generation of a virtual resource of a VRF (node N3) which is one of the virtual router techniques. If a part that matches any of these generation patterns is found in the config, a node of the corresponding node type is generated.

The content described in each cell of the generation pattern 402 will be explained. The first row in the cell means to start a setting of a certain item and the last row means to terminate the setting regarding this item. For example, regarding the generation pattern 412 of a VLAN interface, a row indicating "interface vlan <id>" means to start the setting of a certain VLAN interface and the last row indicating "!" means that it is the last row of description regarding this setting. Any character string(s) which is not indicated in the generation pattern 402 may exist between the start and the end.

For example, the "ip address" row described in the generation pattern 412 is not mandatory. A condition that should be satisfied by the generation pattern is that a node type and an intra-type ID can be identified by means of node generation processing described later. The intra-type ID is an ID for uniquely identifying a node of a certain node type in a certain config (ID of a virtual resource described in the config). In the example of the node pattern management table 241a, the part indicated as <id> in the generation pattern is the intra-type ID. For example, in the case of the generation pattern 411 of the VLAN (node N1), the part <id> corresponding to the VLAN number is the intra-type ID of the node type N1.

Furthermore, the above-explained structure of the node pattern management table 241a is not mandatory and any other appropriate structures may be used. A condition that should be satisfied by the node pattern management table is that the generation pattern can be identified from the config and the node ID can be extracted by means of the node generation processing. Therefore, for example, the device types aaa, bbb, and ccc may not be assigned to each of the node pattern management tables 241a to 241c, and the generation pattern of the device type aaa may be retained in the column 402, the generation pattern of the device type bbb may be retained in another column, and the generation pattern of the device type ccc may be retained in further another column in one table.

FIG. 5 shows an example of the structure of the edge pattern management table 242a. Referring to FIG. 5, the edge pattern management table 242a manages an edge type 501, a connection node type 502, and a setting pattern (connection pattern) 503 for a connection between virtual resources with respect to the device type aaa.

The edge type 501 represents the type of a connection relationship between virtual resources. For example, edge E1 is a connection between the respective virtual resources of a virtual LAN and a virtual interface, edge E2 is a connection between the respective virtual resources of a virtual interface and a virtual router, and edge E3 is a connection between two virtual resources of virtual routers. In this way, each edge type is associated with the node type (connection node type 502) of the two nodes coupled by the edge.

In this example, a connection pattern 511 is a setting pattern for edge E1 connecting the virtual resource of the VLAN (node N1) and the virtual resource of the VLAN interface (node N2); a connection pattern 512 is a setting pattern for edge E2 connecting the virtual resource of the VLAN interface (node N2) and the virtual resource of the VRF (node N3); and a connection pattern 513 is a setting pattern for edge E3 connecting the two virtual resources of the VRFs (node N3). If a part that matches any of these connection patterns is found in the config, the corresponding edge is generated.

The content described in each cell of the connection pattern 503 will be explained. The first row in the cell means to start a setting of a certain item and the last row means to terminate the setting regarding this item. For example, regarding the connection pattern 511, a row starting with "interface vlan" is the first row and the row indicating "!" is the last row. Incidentally, any character string(s) which is not indicated in the example of the connection pattern may exist between the start and the end.

For example, the "ip address" row described in the connection pattern 511 is not mandatory. Furthermore, the connection pattern 513 is composed of a plurality of blocks, that is, a block starting from the "route-map" row and ending with the "!" row and a block starting from the "vrf definition" row and ending with the "!" row. Both blocks are associated with each other by a character string indicated as <name>. Any character string which is not related to this edge may exist between these blocks.

A condition that should be satisfied by the connection pattern is that the edge type and the intra-type ID of two nodes connected to both ends of the edge can be identified by means of edge generation processing described later. The intra-type ID is an ID for uniquely identifying a node of a certain node type in a certain device as described earlier; and in this example, the intra-type ID is a part indicated as <id1> or <id2> in the connection pattern.

Specifically, regarding the connection pattern 512 of edge E2, the part <id1> corresponding to the VLAN interface number is the intra-type ID of one node and the part <id2> corresponding to the VRF number is the intra-type ID of the other node. Incidentally, the intra-type ID of both nodes may be indicated at the same part <id> as in the case of the connection pattern 511 of edge E1.

Incidentally, the above-explained structure of the edge pattern management table 242a is not mandatory and any other appropriate structures may be used. A condition that should be satisfied by the edge pattern management table is that the connection pattern for the edge can be identified from the config and the edge ID can be extracted by means of the edge generation processing. Therefore, for example, the device types aaa, bbb, and ccc may not be assigned to each of the edge pattern management tables 242a to 242c, and the connection pattern of the device type aaa may be retained in the column 503, the connection pattern of the device type bbb may be retained in another column, and the connection pattern of the device type ccc may be retained in further another column in one table.

Figure 6:
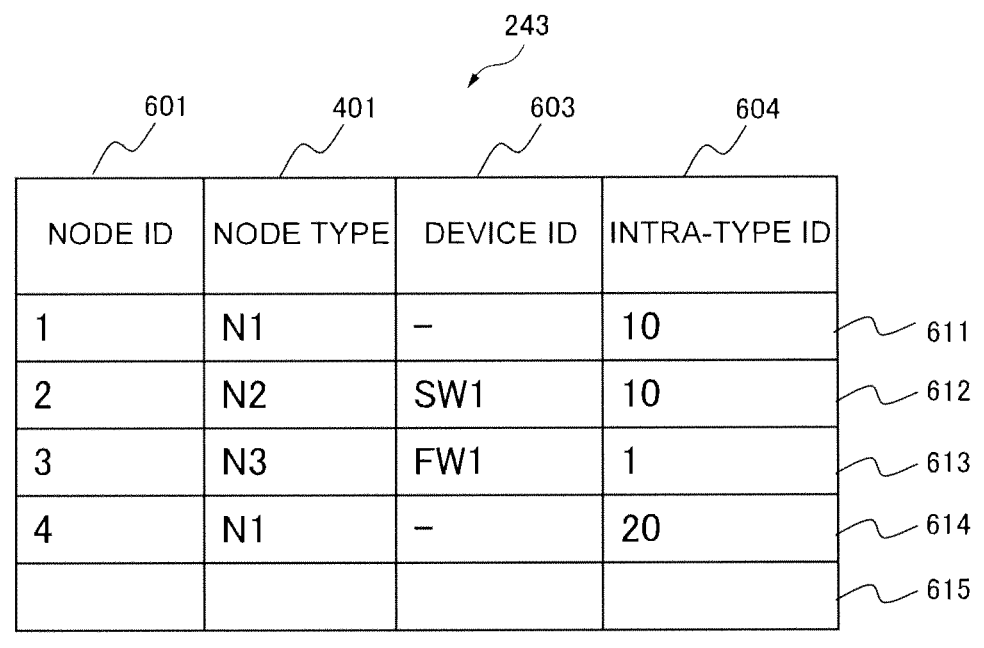

FIG. 6 shows an example of the structure of the node management table 243. Referring to FIG. 6, the node management table 243 is a table for managing nodes generated based on the setting patterns of the config in an integrated manner and this node management table 243 stores virtual resource information. Each node includes a node ID 601 capable of uniquely identifying the relevant node in all the virtual networks. Elements of the node are composed of virtual resource information including the node type 401, an ID 603 of a physical device where the node exists, and an intra-type ID 604.

A row 611 means that there exists a virtual LAN (node N1) whose virtual LAN number (the intra-type ID of the node N1) is 10; a row 612 means that a device SW1 contains a virtual interface (node N2) whose virtual interface number (the intra-type ID of the node N2) is 10; a row 613 means that a device FW contains a virtual router (node N3) whose virtual router number (the intra-type ID of the node N3) is 1.

Incidentally, the above-explained structure of the node management table 243 is not mandatory and any other appropriate structures may be used. Other table structure methods include, for example, a method of preparing separate tables for each node type and a method of preparing separate tables for each device. A condition that should be satisfied by the node management table 243 is that nodes of each node type of each device can be managed in an integrated manner.

Figure 7:
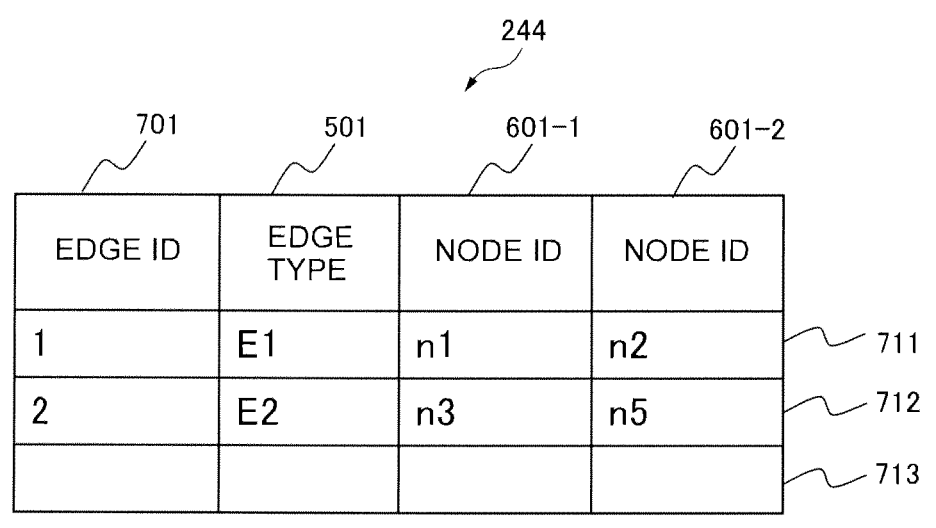

FIG. 7 shows an example of the structure of the edge management table 244. Referring to FIG. 7, the edge management table 244 is a table for managing edge information about edges generated based on the connection patterns of the config in an integrated manner; and this edge management table 244 stores inter-virtual-resource connection information. Each edge has an edge ID 701 capable of identifying the relevant edge in all the virtual networks and includes, as edge information elements, the edge type 501 and node IDs 601-1, 601-2 of nodes coupled to both ends of the edge; and these elements are configured as the inter-virtual-resource connection information. Incidentally, the edge management table 244 does not always require the edge type 501 and only minimum necessary information meaning that specific two nodes are coupled by the relevant edge may be required.

Incidentally, the above-explained structure of the edge management table 244 is not mandatory and any other appropriate structures capable of managing edges may be used. Other table structure methods include, for example, a method of preparing separate tables for each edge type.

Figure 8:
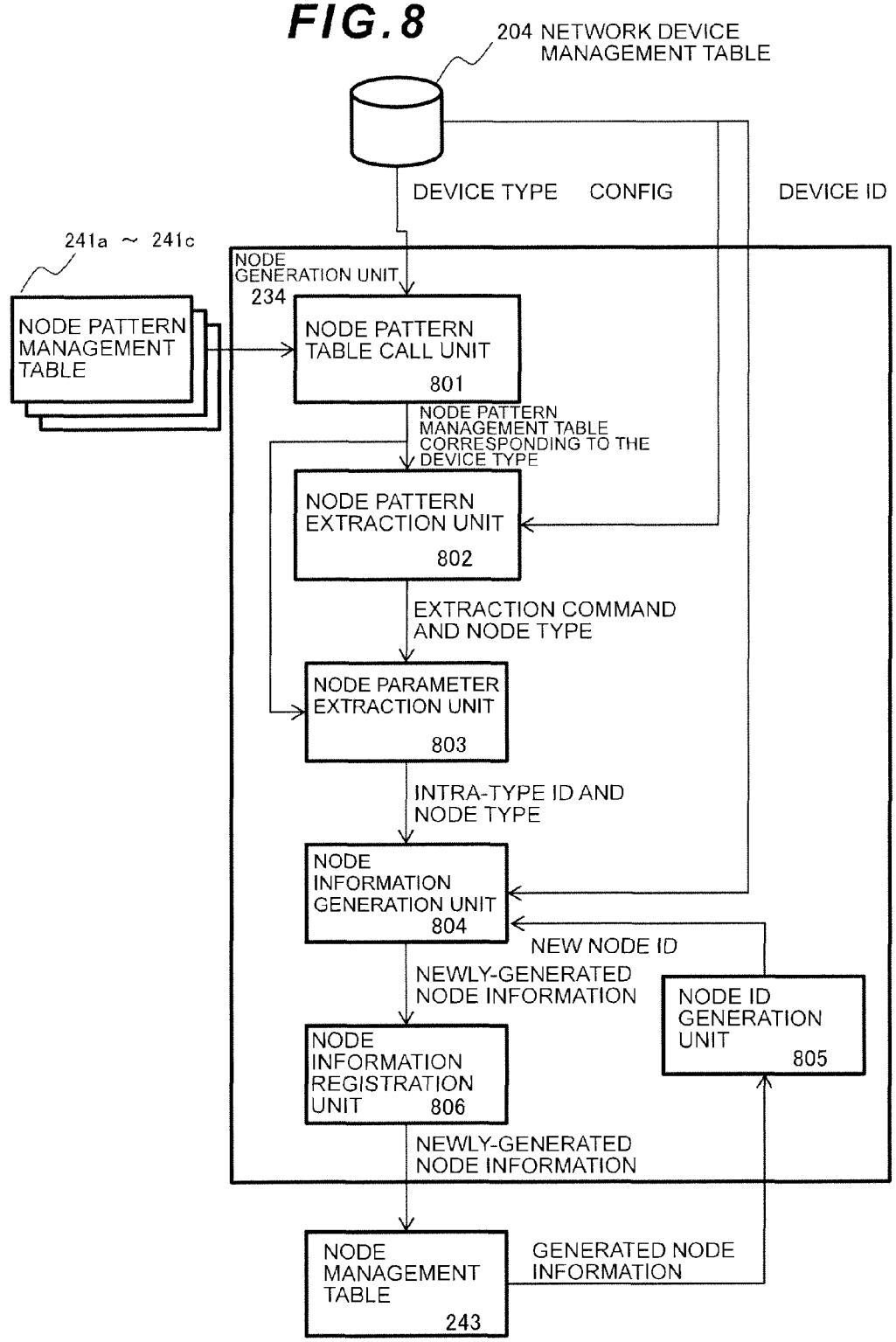
FIG. 8 shows an example of the structure of a node generation unit.

FIG. 8 shows an example of the structure of the node generation unit 234. Referring to FIG. 8, the node generation unit 234 includes, as its components, a node pattern table call unit 801, a node pattern extraction unit 802, a node parameter extraction unit 803, a node information generation unit 804, a node ID generation unit 805, and a node information registration unit 806.

The node pattern call unit 801 calls the node pattern management table 241 corresponding to the device type of a device which is a config analysis target. The device type information is identified from the network device management table 204. The node pattern call unit 801 is executed via the management request reception unit 203 and the overall topology generation unit 207 as triggered by a topology information generation request from the administrator.

The node pattern extraction unit 802 extracts a node generation command from the config in accordance with a generation pattern described in the called node pattern management table 241.

The node parameter extraction unit 803 extracts the intra-type ID of a node with respect to each extracted setting command.

The node information generation unit 804 generates a node whose elements are the node type of the node, the intra-type ID, and the device ID.

The node ID generation unit 805 generates an ID for uniquely identifying the generated node.

The node information registration unit 806 adds the generated node to the node management table 243.

Figure 9:
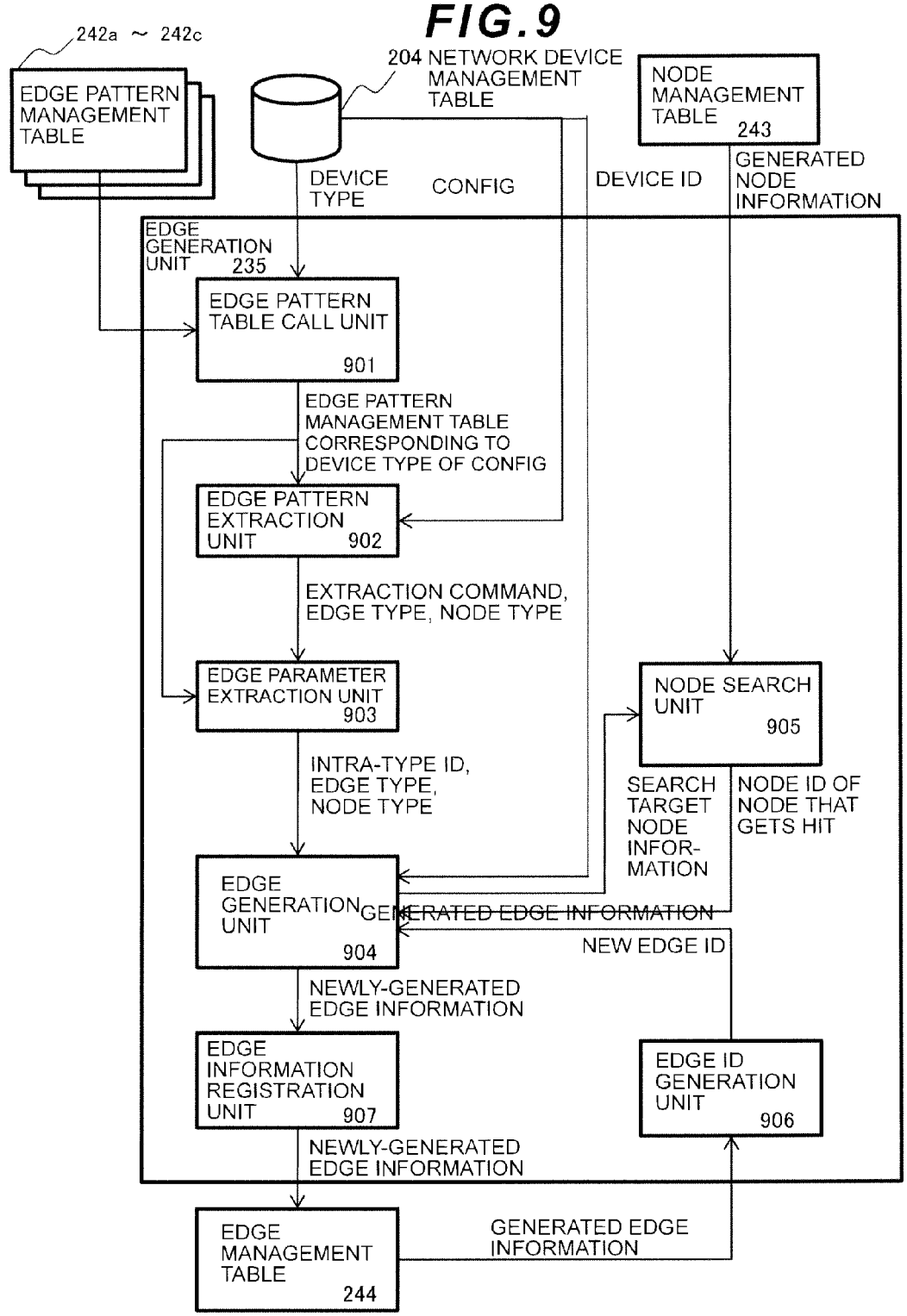
FIG. 9 shows an example of the structure of an edge generation unit.

FIG. 9 shows an example of the structure of the edge generation unit 235. Referring to FIG. 9, the edge generation unit 235 includes, as its components, an edge pattern table call unit 901, an edge pattern extraction unit 902, an edge parameter extraction unit 903, an edge information generation unit 904, a node search unit 905, an edge ID generation unit 906, and an edge information registration unit 907.

The edge pattern table call unit 901 calls the edge pattern management table 242 corresponding to the device type of the device of the analysis target config. The device type information is identified from the network device management table 204.

The edge pattern extraction unit 902 extracts a connection command regarding the edge from the config based on the called edge pattern management table.

The edge parameter extraction unit 903 extracts the intra-type ID of two nodes coupled by the edge with respect to each extracted connection command.

The edge information generation unit 904 generates information of the two nodes coupled by the edge (elements of the node include the extracted intra-type ID, the device ID, and the node type).

The node search unit 905 searches the node management table 243 for the two nodes based on the information of the two nodes and then returns the node IDs of the two nodes. These two node IDs are included in the elements of the generated edge.

The edge ID generation unit 906 generates an ID for uniquely identifying the generated edge.

The edge information registration unit 907 adds the generated edge to the edge management table 244.

Figure 10:
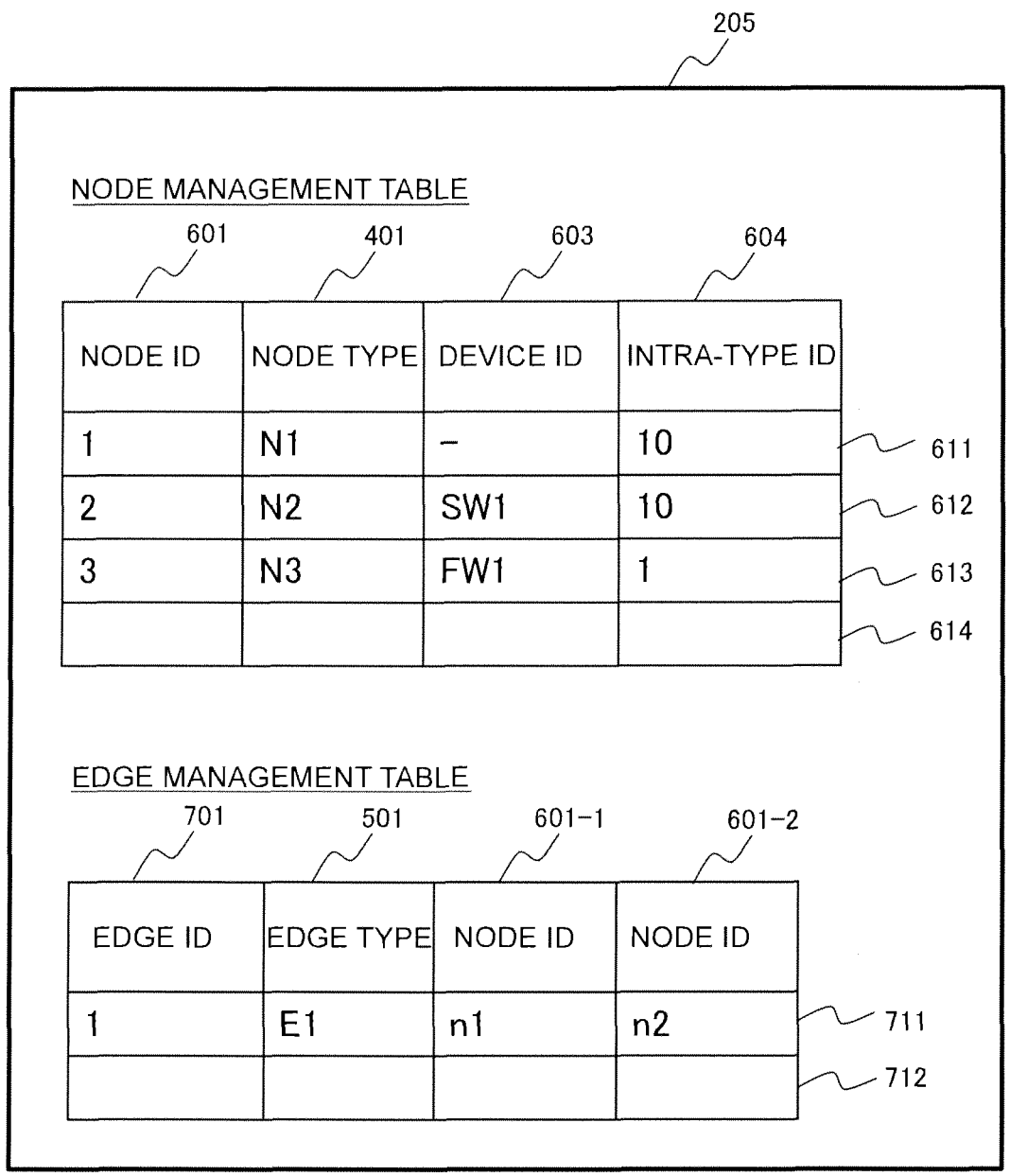
FIG. 10 shows an example of the structure of an overall topology DB.

FIG. 10 is a configuration diagram showing the overall topology DB 205. Referring to FIG. 10, the overall topology DB 205 has information corresponding to the node management table 243 and the edge management table 244 in order to show the topology information of all the networks.

Figure 11:
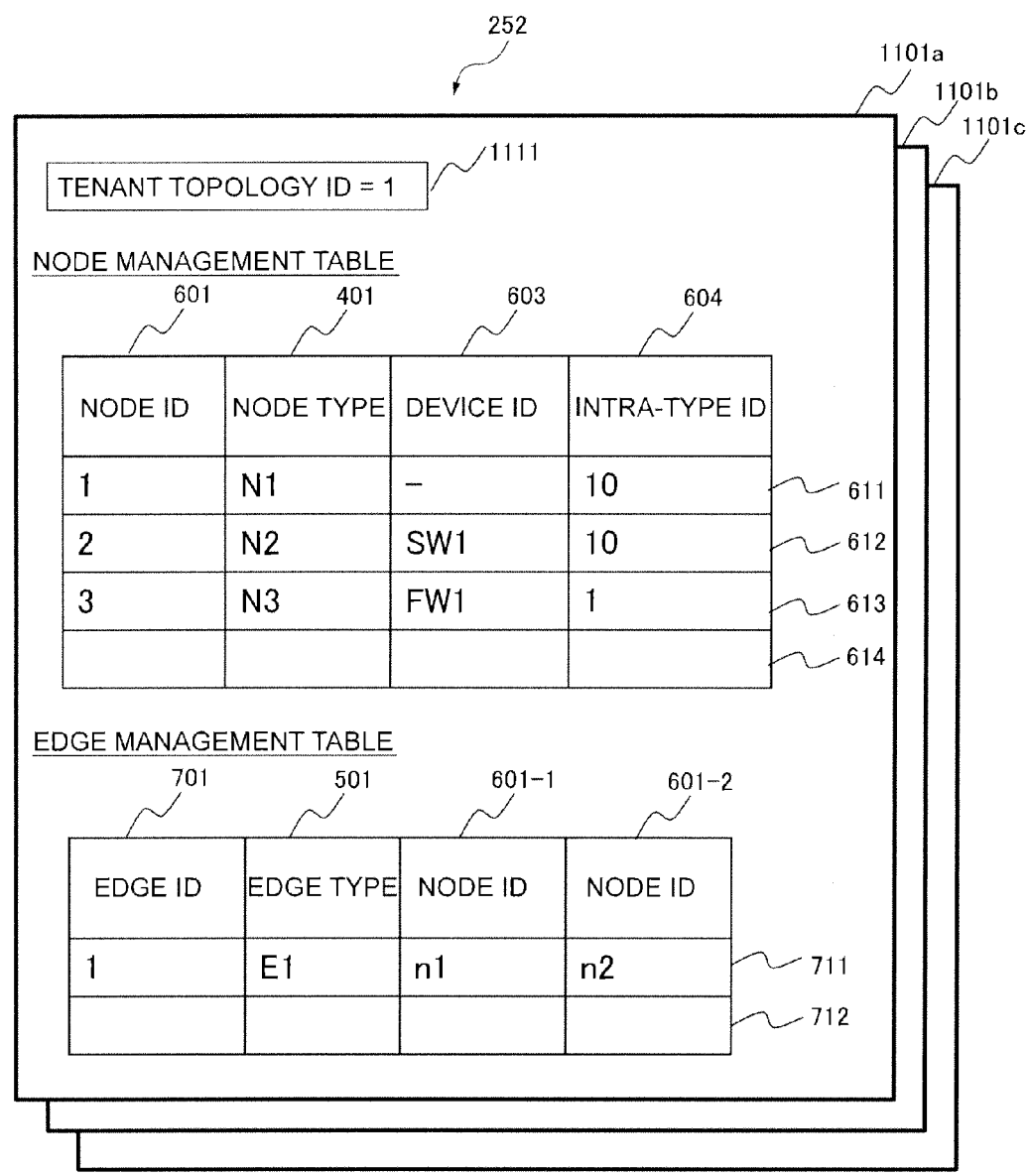
FIG. 11 shows an example of the structure of a tenant topology management DB.

FIG. 11 is a configuration diagram showing the tenant topology management DB 252. Referring to FIG. 11, the tenant topology management DB 252 has sub-databases 1011a to 1011c with a tenant ID 1111 in order to manage topologies on a tenant basis. The sub-database 1101a to 1101c corresponding to each tenant has information corresponding to the node management table 243 and the edge management table 244.

Incidentally, regarding the structure of the tenant topology management DB 252, it is only necessary that nodes, edges, and tenants are associated with each other and other appropriate structures may be used. For example, a method of adding the tenant ID 1111 column to the node management table and the edge management table in one database and associating the tenant ID with individual nodes and edges may be used without creating the sub-databases 1101a to 1101c on the tenant basis.

Figure 12:
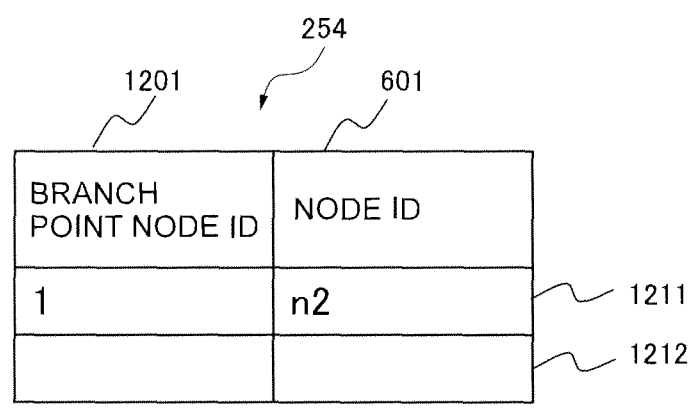
FIG. 12 shows an example of the structure of a tenant branch point management table.

FIG. 12 is a structure diagram showing the branch point management table 254. Referring to FIG. 12, the branch point management table 254 retains node information, which aggregates a plurality of tenant topologies in the overall topology, as a virtual resource of a branch point (branch point resource). In this embodiment, a branch point node ID 1201 and the node ID 601 are included as branch point resource information.

Incidentally, this table structure is not necessarily mandatory and it is only necessary that the branch point resource may be identified uniquely from the overall topology. For example, the branch point management table may have the same components as those of the node management table 243.

Figure 13:
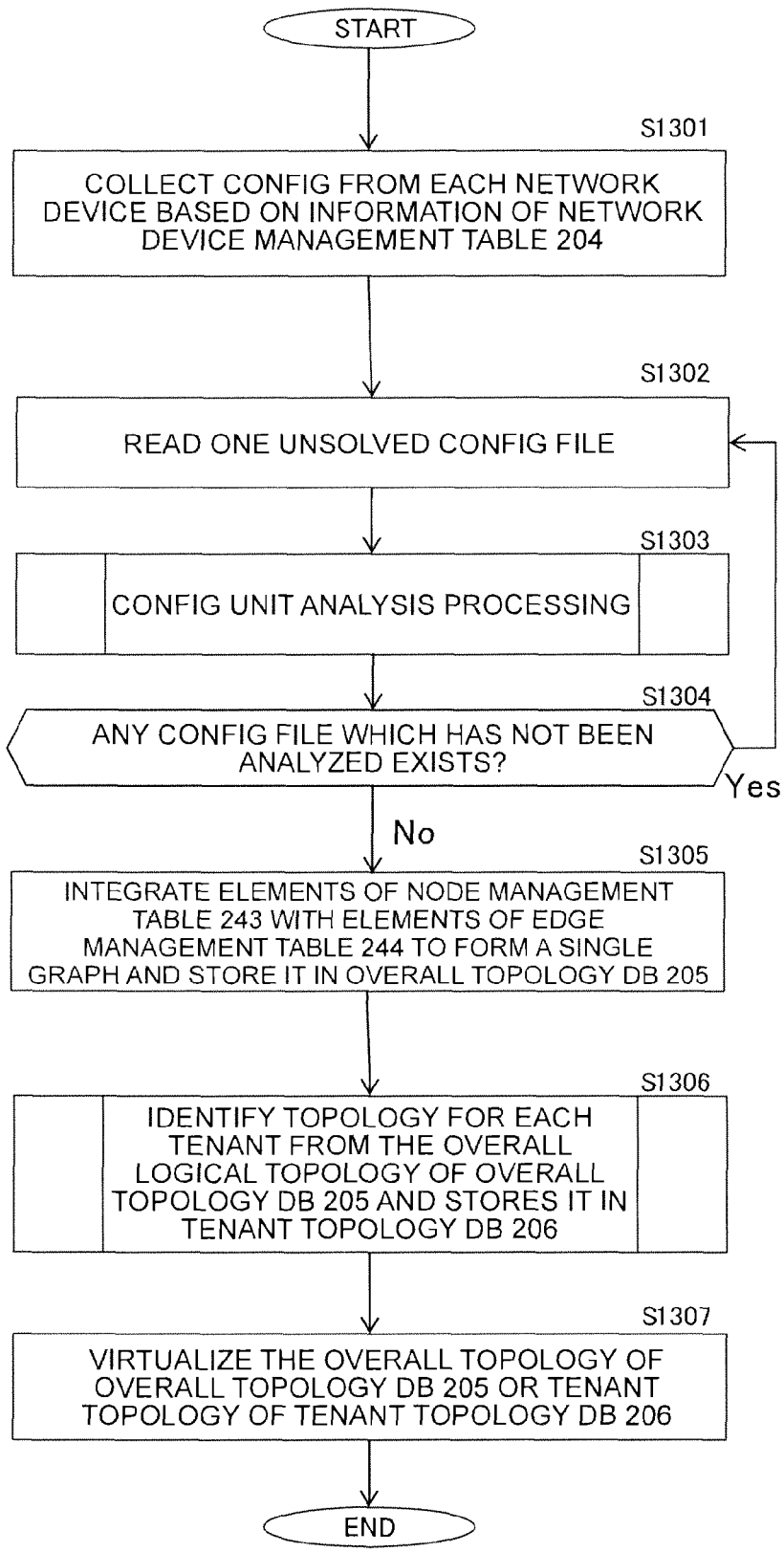
FIG. 13 is an example of a flowchart for explaining tenant topology generation.

FIG. 13 shows a generation flow of the tenant topology information. Referring to FIG. 13, the config collection unit 201 collects the config from each network device based on information of the network device management table 204 (S1301). Methods used to collect the config include, for example, a telnet, a TFTP (Trivial File Transfer Protocol), a NETCONF (Network Configuration Protocol), or an SNMP (Simple Network Management Protocol).

Next, the overall topology construction unit 236 of the overall topology generation unit 207 reads one config file, which has not been analyzed, among the configs collected by the config collection unit 201 (S1302) and executes config unit analysis processing on each config collected from each device (S1303). Subsequently, the overall topology construction unit 236 judges whether there remains any unanalyzed config file (S1304); and if there remains any unanalyzed config file, the overall topology construction unit 236 returns to the processing in step S1302; and if there is not any unanalyzed config file, the overall topology construction unit 236 proceeds to processing in step S1305. Incidentally, in the processing S1303, the processing for generating one or more nodes and edges is executed with respect to individual configs. Its details will be explained with reference to FIG. 14.

Next, after the overall topology construction unit 236 finishes analyzing all the configs and generating all the nodes and edges, it integrates the elements of the node management table 243 with the elements of the edge management table 244 to form a single graph and store the graph in the overall topology DB 205 (S1305).

Then, the tenant topology identification unit 208 identifies an individual tenant topology from the overall topology in the overall topology DB 205 and stores the individual tenant topology as a partial network topology or one virtual network in the tenant topology DB 206 (S1306). Its details will be explained with reference to FIG. 17.

Lastly, the GUI display control unit 221 visualizes the logical topology of the entire virtual network in the overall topology DB 205 or the tenant topology in the tenant topology DB 206 and displays it on the console 110 (S1307).

Figure 14:
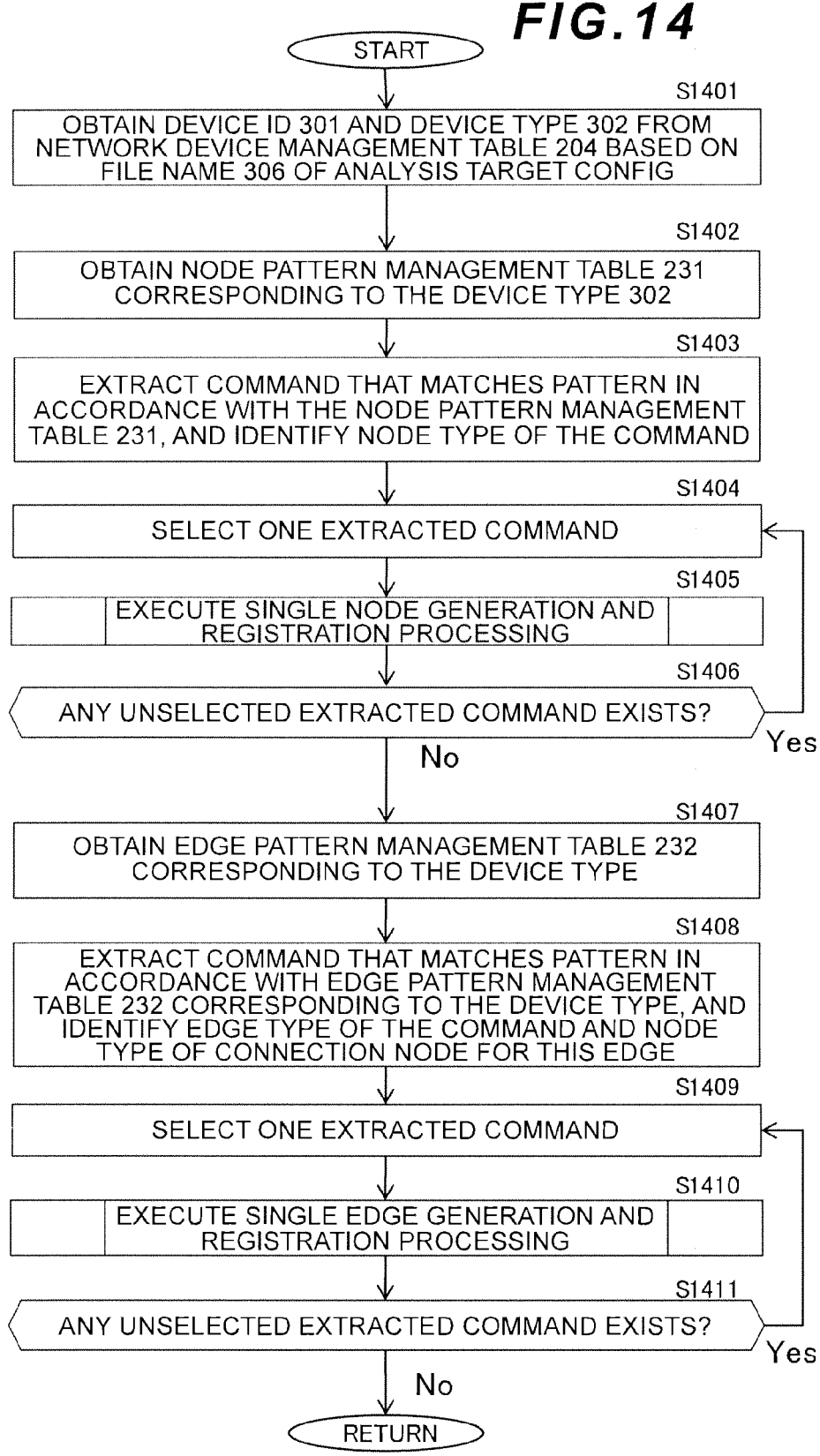
FIG. 14 is an example of a flowchart for explaining config unit analysis processing.

FIG. 14 is a diagram illustrating a flow of the config unit analysis processing S1303. Referring to FIG. 14, the overall topology generation unit 207 firstly identifies the device ID 301 and the device type 302 corresponding to the config from the network device management table 204 based on the file name 306 of the analysis target config (S1401).

Next, the processing proceeds to the node generation processing and the node pattern table call unit 801 of the node generation unit 234 identifies the node pattern management table 241 corresponding to the device type identified from the network device management table 204 (S1402).

The node pattern extraction unit 802 extracts a command corresponding to the node pattern 402 from the config based on the table identified above and also identifies the node type 401 of the extracted command (S1403).

Then, the node generation unit 234 executes single node generation processing and registration processing on each extracted command (S1405). By means of this processing, the node generation unit 234 generates a node corresponding to one extracted command and registers it in the node management table 243. The details of this processing will be explained with reference to FIG. 15. Subsequently, the node generation unit 234 judges whether any unselected extracted command exists or not (S1406), if any unselected extracted command exists, the node generation unit 234 returns to the processing in step S1404; and if any unselected extracted command does not exist, the node generation unit 234 proceeds to edge generation processing in step S1407.

After the completion of the node generation processing, the processing proceeds to the edge generation processing; and the edge pattern table call unit 901 of the edge generation unit 235 identifies the node pattern management table 241 corresponding to the device type obtained from the network device management table 204 with respect to the analysis target config (S1407).

The edge pattern extraction unit 902 extracts a command corresponding to the connection pattern 503 from among the config based on the table identified above and also identifies the edge type 501 corresponding to the extracted command and the node type 502 of two nodes coupled to this edge (S1408).

Then, the edge generation unit 235 selects one extracted command (S1409) and executes single edge generation processing and registration processing on each selected command (S1410). By means of this processing, the edge generation unit 235 generates an edge corresponding to the selected command and registers it in the edge management table 244. The details of this processing will be explained with reference to FIG. 16. Subsequently, the edge generation unit 235 judges whether any unselected extracted command exists or not (S1411). If any unselected extracted command exists, the edge generation unit 235 returns to the processing in step S1409; and if any unselected extracted command does not exist, the edge generation unit 235 terminates the processing in this routine.

Incidentally, in this embodiment, all the commands that match node patterns in the config are extracted and the node generation processing is then executed on each command; however, this order is not mandatory. Specifically, any other appropriate methods may be employed: for example, every time one command is extracted, the node generation processing may be executed on this extracted command.

Similarly, the order of the edge pattern extraction processing and the edge processing is not mandatory. Specifically, any other appropriate methods may be employed: for example, every time one command that matches the edge pattern is extracted, the edge generation processing may be executed with respect to this extracted command.

Furthermore, in this embodiment, the edge generation processing is executed after the node generation processing; however, this order is not mandatory, either, and both the processing may be executed in parallel. Specifically, while the config is being analyzed, parallel matching processing may be executed on patterns regarding nodes and edges and the node(s) and edge(s) related to the found pattern(s) may be generated as appropriate. When generating an edge, individual nodes and the edge may be generated in any order as long as it satisfies the condition that nodes to be coupled to the both ends of the edge have already been generated.

Figure 15:
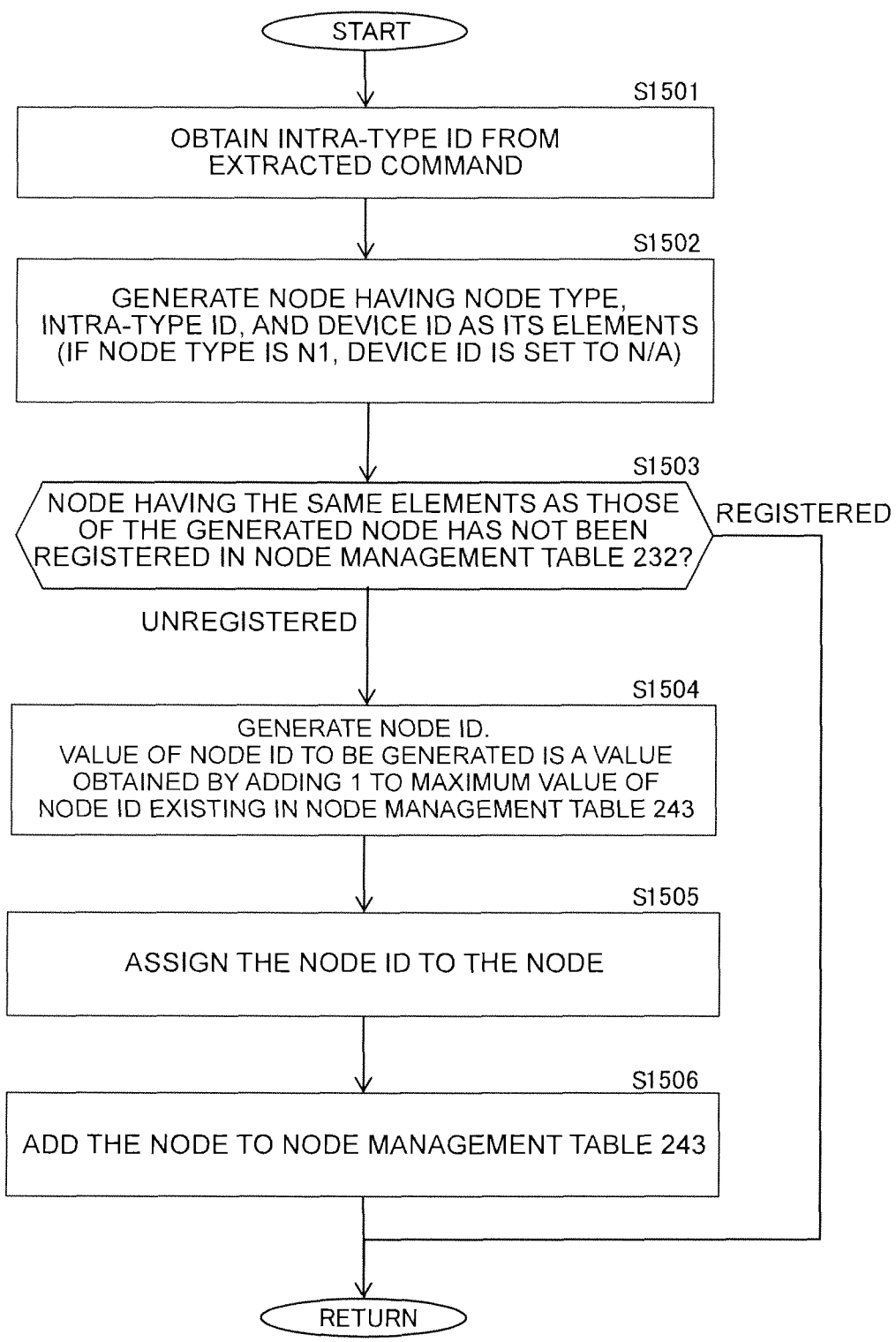
FIG. 15 is an example of a flowchart for explaining single node generation and registration processing.

FIG. 15 is a diagram illustrating a processing flow of the single node generation and registration processing S1405. Referring to FIG. 15, by means of this processing, a node corresponding to the extracted command is generated and registered in the node management table 243. For that purpose, the following processing is executed.

Firstly, the node parameter extraction unit 803 identifies the intra-type ID from the extracted command (S1501). Specifically, the node parameter extraction unit 803 identifies the intra-type ID of the node with respect to one command extracted in step S1403 in accordance with the node type identified in step S1403 and the generation pattern 402 in the node pattern management table 241.

Next, the node information generation unit 804 generates a new node (S1502). There are three elements that the newly generated node should have: the node type (identified in step S1403), the intra-type ID (identified in step S1501), and the device ID (identified in S1401). Incidentally, if the node type is N1 (virtual resource of the virtual LAN technique), the device ID will not exceptionally be assigned (or a fixed character string such as 'n/a' will be assigned to the device ID). The reason why no device ID is assigned to the node of the virtual LAN will be explained later.

Then, the node information registration unit 806 checks if a node having the same elements as those of the generated node already exists in the node management table 243 or not (S1503). If such a node does not exist, the following processing (S1504 to S1506) will be executed; and if such a node exists, the following processing will not be executed and the single node generation and registration processing S1405 will be terminated.

The node ID generation unit 805 generates the node ID corresponding to the newly generated node (S1504). In this embodiment, the node ID should be an integer and a value obtained by adding 1 to a maximum value of the node IDs of nodes existing in the node management table 243 is set as the node ID of the newly generated node. The value of the node ID to be generated is a value obtained by adding 1 to a maximum value of the node IDs existing in the node management table 243. Incidentally, the node ID may be decided by other methods. A condition that the format of the node ID and generation rules should comply with is that each node can be uniquely identified in all the networks.

The node information generation unit 804 assigns the above-mentioned node ID to the newly generated node (S1505).

The node information registration unit 806 adds the newly generated node, to which the node ID is assigned, to the node management table 243 (S1506). The above-described processing is the single node generation and registration processing.

Figure 16:
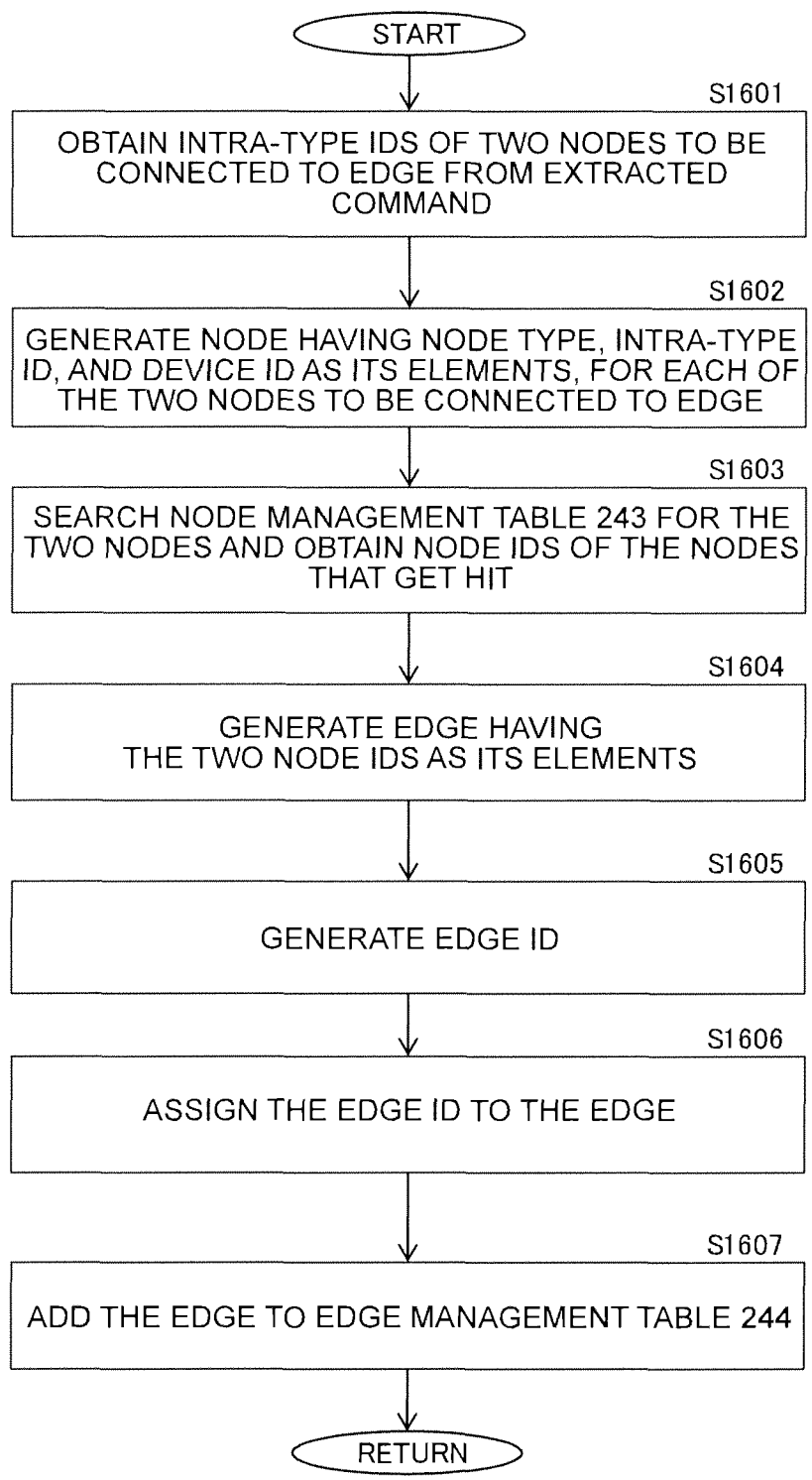
FIG. 16 is an example of a flowchart for explaining single edge generation and registration processing.

FIG. 16 is a flowchart illustrating the single edge generation and registration processing S1410. Referring to FIG. 16, by means of this processing, an edge corresponding to the extracted command is generated and registered in the edge management table 244. For that purpose, the following processing will be executed.

Firstly, the edge parameter extraction unit 903 identifies the intra-type IDs of two nodes coupled by the edge from the extracted command (S1601). Specifically, the intra-type IDs of the two nodes coupled by the edge is identified with respect to one command extracted in step S1409 in accordance with the edge type identified in step S1408, the node type of the two nodes coupled to the edge, and the connection pattern 503 in the edge pattern management table 242.

Next, the edge information generation unit 904 generates the node information of the two nodes coupled to the edge (S1602). There are three elements that the node should have: the node type (identified in step S1108), the intra-type ID (identified in step S1601), and the device ID (identified in S1401). Incidentally, if the node type is N1 (virtual resource of the virtual LAN), the device ID will not be assigned as an exception (or a fixed character string such as 'n/a' will be input to the device ID).

The reason why no device ID is assigned to a virtual LAN node is that the setting information of the virtual LAN is shared by a plurality of devices. As no device ID is assigned to the virtual LAN node and the setting information is shared by a plurality of devices, a VLAN interface node for the plurality of devices can be directly coupled from only the device setting information and the logical topology information of all the networks can be generated eventually. Incidentally, it is also necessary to assign the device ID to a virtual LAN node in order to obtain strict connection information and the virtual LAN node is generated for each device. In this case, information of physical connections is required in order to link both the virtual LAN nodes. However, if the settings of the physical connections are correct as in a case of an active datacenter, physical information can be omitted and the logical topology information can be generated by considering only logical information.

Then, the node search unit 905 searches the node management table 243 for a node having the same elements as those of the two nodes generated in S1403 (S1603). The node search unit 905 delivers the node IDs of the two nodes, which were found by this search, to the edge information generation unit 904.

The edge information generation unit 904 generates a new edge (S1604). Elements to be provided to the edge are the edge type and the node IDs of the two nodes coupled by the edge.

The edge ID generation unit 906 generates the edge ID corresponding to the newly generated edge (S1605). In this embodiment, the edge ID should be an integer and a value obtained by adding 1 to a maximum value of the edge IDs of edges existing in the edge management table 244 is set as the edge ID of the newly generated edge. Incidentally, the edge ID may be decided by other methods. A condition that the format of the edge ID and generation rules should comply with is that each edge can be uniquely identified in all the networks.

The edge information generation unit 904 assigns the above-mentioned edge ID to the newly generated edge (S1606).

The edge information registration unit 907 adds the newly generated edge, to which the edge ID is assigned, to the edge management table 244 (S1607). The above-described processing is the single edge generation and registration processing.

Figure 17:
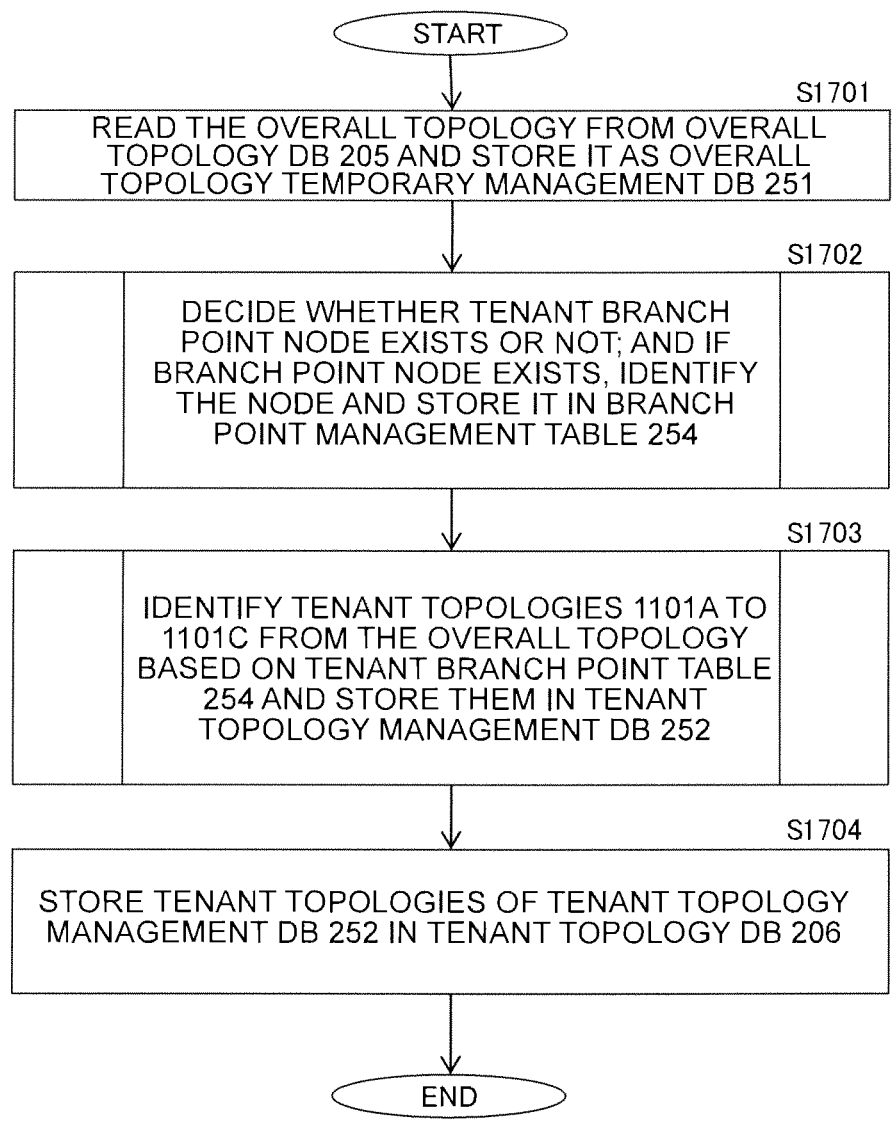
FIG. 17 is an example of a flowchart for explaining tenant topology identification processing.

FIG. 17 is a diagram illustrating a flow of the tenant topology identification processing S1306. Referring to FIG. 17, by means of this processing, an individual tenant topology is identified from the overall topology in the overall topology DB 205 and is stored in the tenant topology DB 206. For that purpose, the following processing will be executed.

Firstly, the tenant topology identification unit 208 reads the overall topology from the overall topology DB 205 and retains it in the overall topology temporary management DB 251 (S1701).

Next, the tenant branch point decision unit 253 judges whether or not there is a branch point resource (which connects multiple tenant networking); and if the branch point node exists, the tenant branch point decision unit 253 identifies that node and registers it in the branch point management table 254 (S1702). The details of this processing will be explained with reference to FIG. 18.

Next, the tenant topology search unit 255 searches the overall topology temporary management DB 251 for individual tenant topologies based on the information of the branch point management table 254 and stores the identified tenant topologies 1101a to 1101c in the tenant topology management DB 252 (S1703). The details of this processing will be explained with reference to FIG. 21.

Lastly, the tenant topologies in the tenant topology management DB 252 are stored in the tenant topology DB 206 (S1704). The above-described processing is the flow of the tenant topology identification processing.

Figure 18:
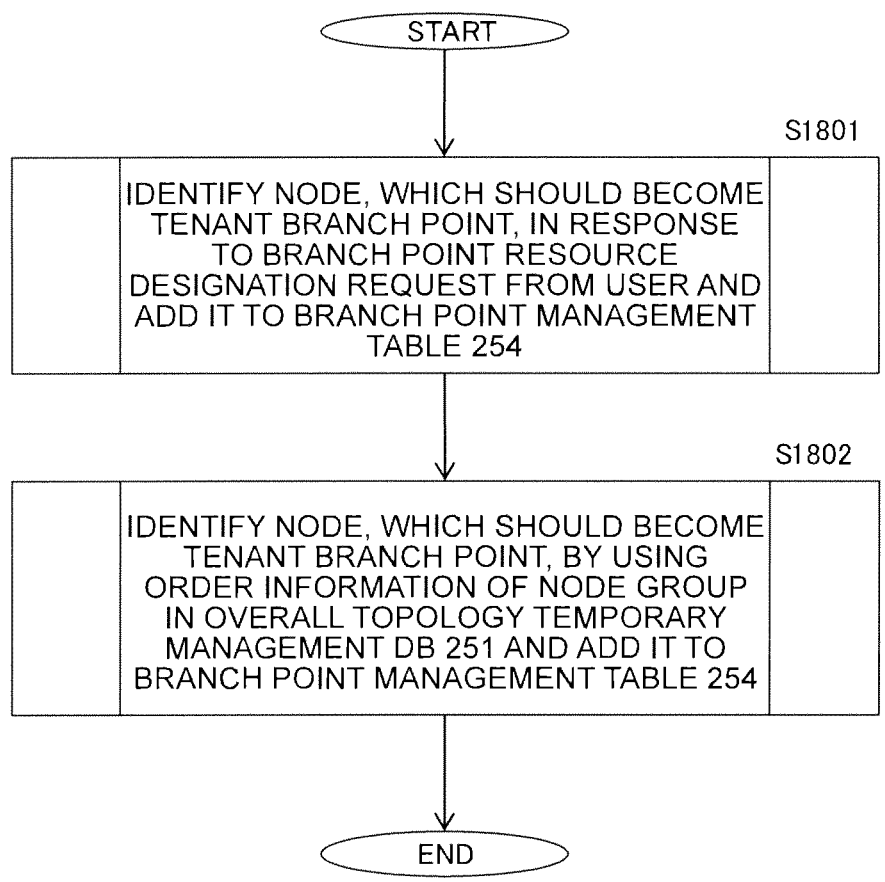
FIG. 18 is an example of a flowchart for explaining tenant branch point decision processing.

FIG. 18 is a diagram illustrating a flow of the tenant branch point decision processing S1702. Referring to FIG. 18, the request analysis unit 261 firstly analyzes a branch point resource designation request from the user, identifies a branch point resource designated from the overall topology temporary management DB 251, and adds it to the branch point management table 254 (S1801). The details of this processing will be explained with reference to FIG. 19.

Next, the branch point judgment unit 262 identifies a node, which becomes a tenant branch point, by using degree information of a node group in the overall topology temporary management DB 251 and adds it to the branch point management table 254 (S1802). The details of this processing will be explained with reference to FIG. 20. The above-described processing is the flow of the tenant branch point decision processing S1702.

Figure 19:
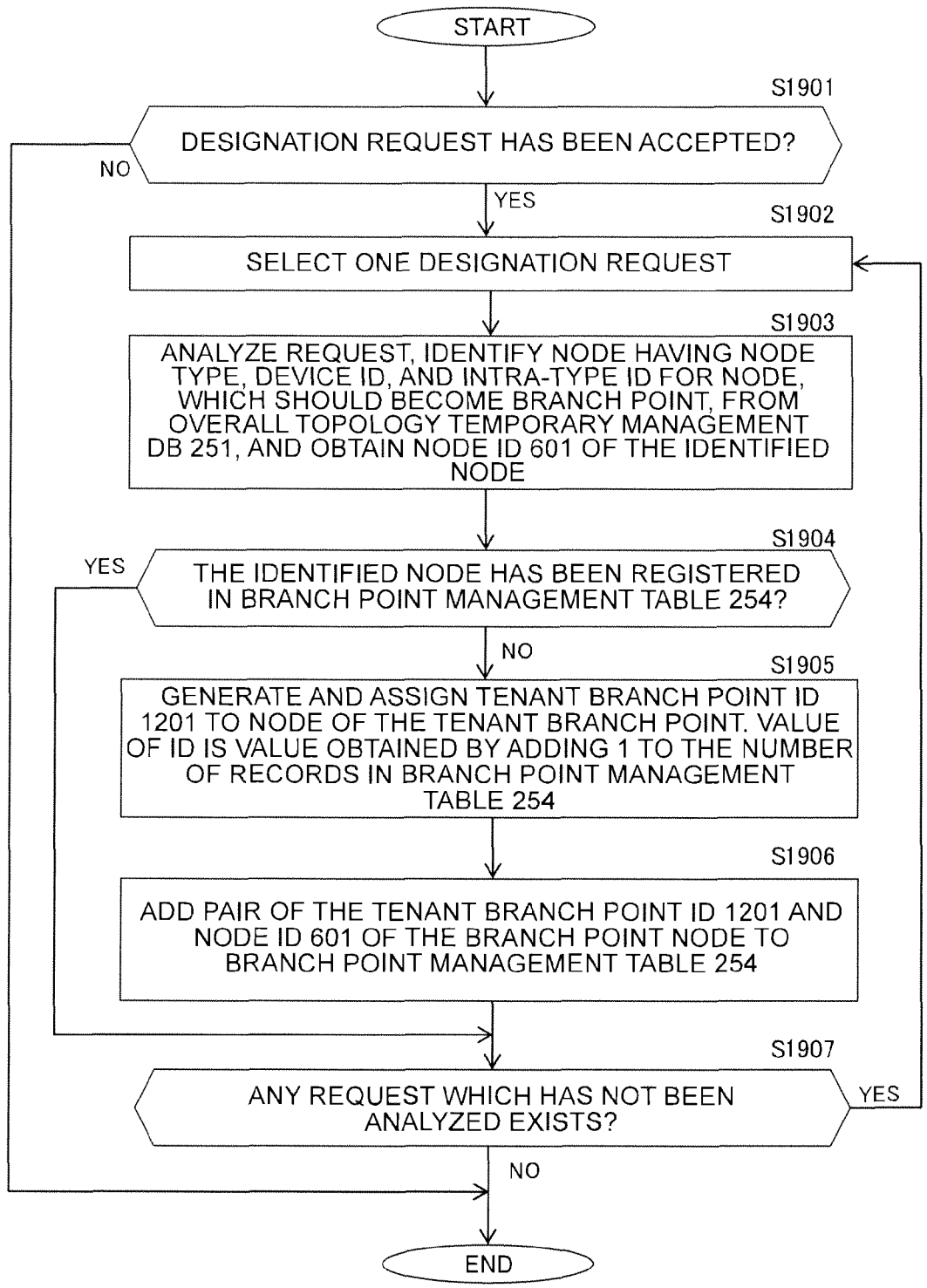
FIG. 19 is an example of a flowchart for explaining tenant branch point request analysis processing.

FIG. 19 is a diagram illustrating a flow of the tenant branch point request analysis processing S1801. Referring to FIG. 19, by means of this processing, a branch point resource designation request from the user is analyzed and a branch point resource designated from the overall topology temporary management DB 251 is identified and added to the branch point management table 254.

Firstly, the request analysis unit 261 judges whether the branch point resource designation request from the user has been received or not (S1901). If there is no received request, the request analysis unit 261 terminates the processing in this flow; and if there is a received request, the request analysis unit 261 executes the following processing.

Next, the request analysis unit 261 selects one registration request (S1902). Subsequently, the request analysis unit 261 analyzes the selected request, identifies a node corresponding to the designated branch point resource from the overall topology temporary management DB 251, and obtains the node ID 601 (S1903). In this embodiment, three elements, that is, the node type 401, the device ID 603, and the intra-type ID 604 of the node which is the branch point resource are included as a request format.

The request analysis unit 261 refers to the overall topology temporary management DB 251 and identifies the node including these three elements. Incidentally, the content of the request may be of any form as long as the branch point resource can be identified from the overall topology; and the node ID 601 may be included in the request.

After the branch point registration unit 263 obtains the node ID 601 of the branch point resource, it checks if this node has been registered in the branch point management table 254 or not (S1904). If it has been registered, the branch point registration unit 263 terminates the processing in this flow; and if it has not been registered, the branch point registration unit 263 executes the following processing.

The branch point registration unit 263 generates and assigns the tenant branch point ID 1201 to the branch point resource (S1905). The value of the ID is a value obtained by adding 1 to the number of records in the branch point management table 254. In this embodiment, the number obtained by adding 1 to the number of records in the tenant branch point management table 254 is set as the tenant branch point ID; however, if an ID that can be uniquely identified in the branch point management table 254 can be assigned, other appropriate methods may be used.

Then, the branch point registration unit 263 adds a pair of the obtained node ID 601 and the generated branch point ID 1201 to the branch point management table 254 (S1906).

If there is any registration request which has not been analyzed, the branch point registration unit 263 returns to step S1902 and the request analysis unit 261 executes the same processing on all registration requests (S1907). The above-described processing is the flow of the tenant branch point request analysis processing S1801.

Figure 20:
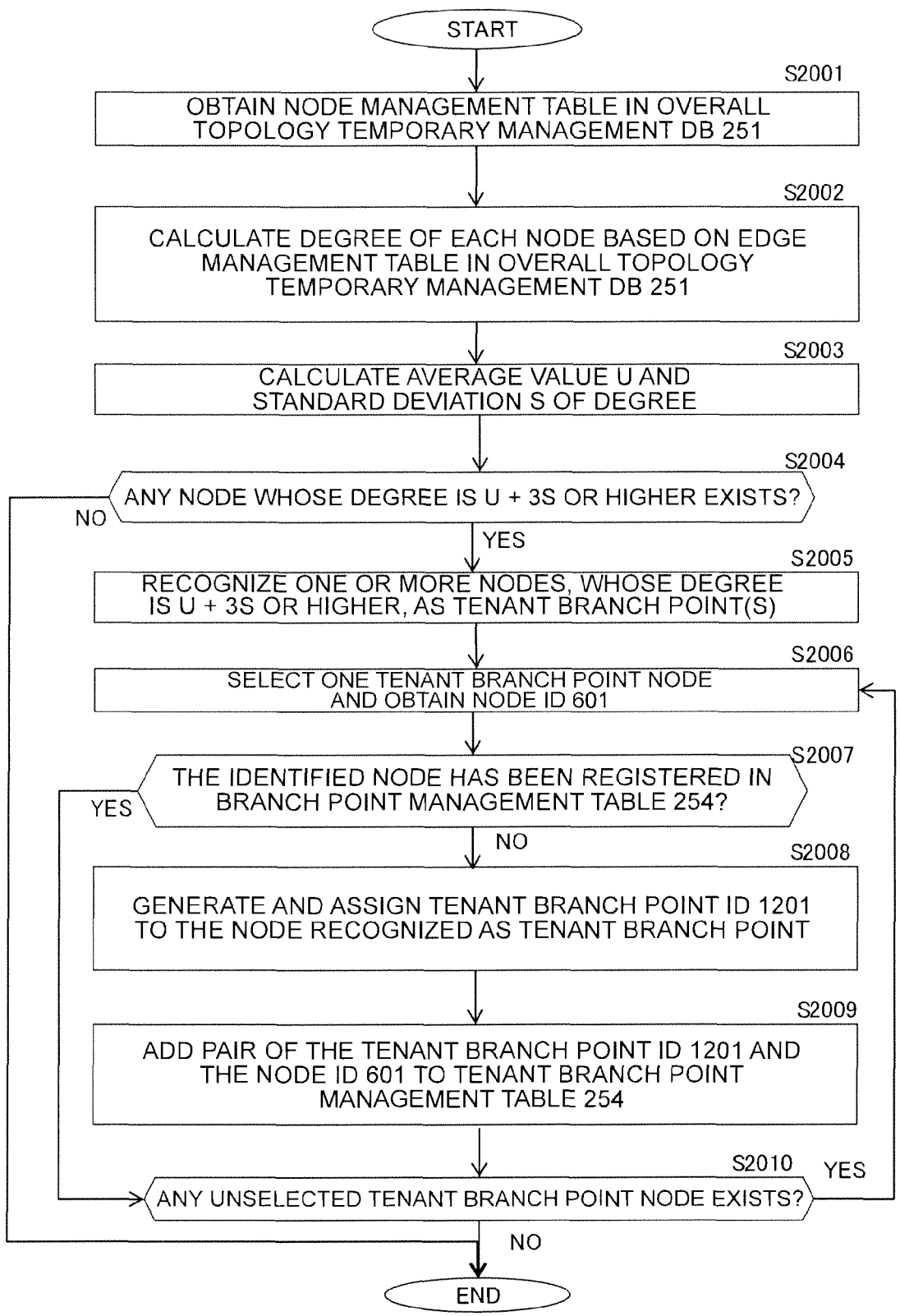
FIG. 20 is an example of a flowchart for explaining tenant branch point estimation processing.

FIG. 20 shows a flow of the tenant branch point estimation processing S1802. Referring to FIG. 20, by means of this processing, the tenant branch point decision unit 253 judges whether the branch point resource exists or not; and if the branch point node exists, the tenant branch point decision unit 253 identifies that node and register it in the branch point management table 254.

Firstly, the branch point estimation unit 262 obtains a node management table in the overall topology temporary management DB 251 (S2001).

Next, the branch point estimation unit 262 calculates the degree of each node (S2002). The degree of a node means the number of the node's edges; and an example of a calculation method is a method of referring to the edge management table in the overall topology temporary management DB and recognizing the number of records, to which the calculation target node belongs, as the degree.

Then, the branch point estimation unit 262 calculates an average value u and a standard deviation s of the degree (S2003).

Next, the branch point estimation unit 262 judges whether any node whose degree exceeds u+3s exists or not (S2004). If any node that satisfies the above-described condition does not exist, the branch point estimation unit 262 terminates the processing in this flow; and if such a node exists, the branch point estimation unit 262 executes the following processing.

The branch point estimation unit 262 firstly recognizes one or more identified nodes as the branch point node(s) (S2005).

Next, the branch point estimation unit 262 selects one branch point node from the one or more branch point nodes and obtains the corresponding node ID 601 (S2006).

Then, the branch point registration unit 263 checks if the identified node has been registered in the branch point management table 254 or not (S2007). If it has been registered, the branch point registration unit 263 proceeds to step S2010; and if it has not been registered, the branch point registration unit 263 executes the following steps.

If the identified node has not been registered in the branch point management table 254, the branch point estimation unit 262 generates and assigns a tenant branch point ID to the selected branch point node (S2008). In this embodiment, the number obtained by adding 1 to the number of records in the tenant branch point management table 254 is set as the tenant branch point ID; however, if an ID that can be uniquely identified in the branch point management table 254 can be assigned, other appropriate methods may be used.

Then, the branch point registration unit 263 adds a pair of the obtained node ID 601 and the generated branch point ID 1201 to the branch point management table 254 (S2009).

The branch point estimation unit 262 judges whether any unselected tenant branch point node exists or not (S2010). If any unselected branch point node exists, the branch point estimation unit 262 returns to step S2006 and executes the same processing on all the branch point nodes (S2010); and if any unselected branch point node does not exist, the branch point estimation unit 262 terminates the processing in this routine. The above-described processing is the flow of the tenant branch point processing S1802.

Incidentally, the estimated tenant branch point may be presented to the user via the console 110 and the user may check whether the estimated tenant point is accurate or not, and then correct it as the need arises.

Furthermore, the degree information is used for estimation of the tenant branch point in this embodiment, but there are other methods as follows.

A first example method is a method of: assuming that a node which is a tenant branch point is characterized by a statistically dominant difference from other nodes by aggregating a large number of tenants; and finding the node with this characteristic. In this embodiment, a node whose degree is u+3s or higher is identified; however, an arbitrary statistic outlier detection method may be employed and arbitrary statistic information may be further used. For example, the statistic information of the node may not be limited to the degree, but other metrics such as betweenness and closeness may be adopted.

A next example method is a method of recognizing a node, which has a function of distributing packets to a specific egress destinations in accordance with the characteristics of the packets in a manner incompatible with the conventional packet routing, as a branch point node. For example, there is a method of identifying a virtual router, which explicitly designates egress virtual interfaces according to an IP address of the source (not the destination) of the packet(s) or an IP address of a destination of the received packet(s) by means of policy base routing (PBR), from the setting information of the relevant device and recognizing the virtual router as the tenant branch point node. Under this circumstance, a method of recognizing only a virtual router, which performs NAT (Network Address Translation) in the same way as PBR, as the tenant branch point node is also possible. In this case like the case of PBR, it is also necessary to identify NAT settings from the setting information of the devices.

Furthermore, another method may be a method of recognizing a node, which is generated at a specific device, as the tenant branch point. For example, there is a method of recognizing a node having a device ID with respect to a device equipped with a function aggregating a plurality of tenants, such as a border router serving as a gateway to the Internet, as the tenant branch point. Other examples of devices serving to aggregate tenants include switches for management segments, devices for SSL-VPN, and devices for NAT.

Figure 21:
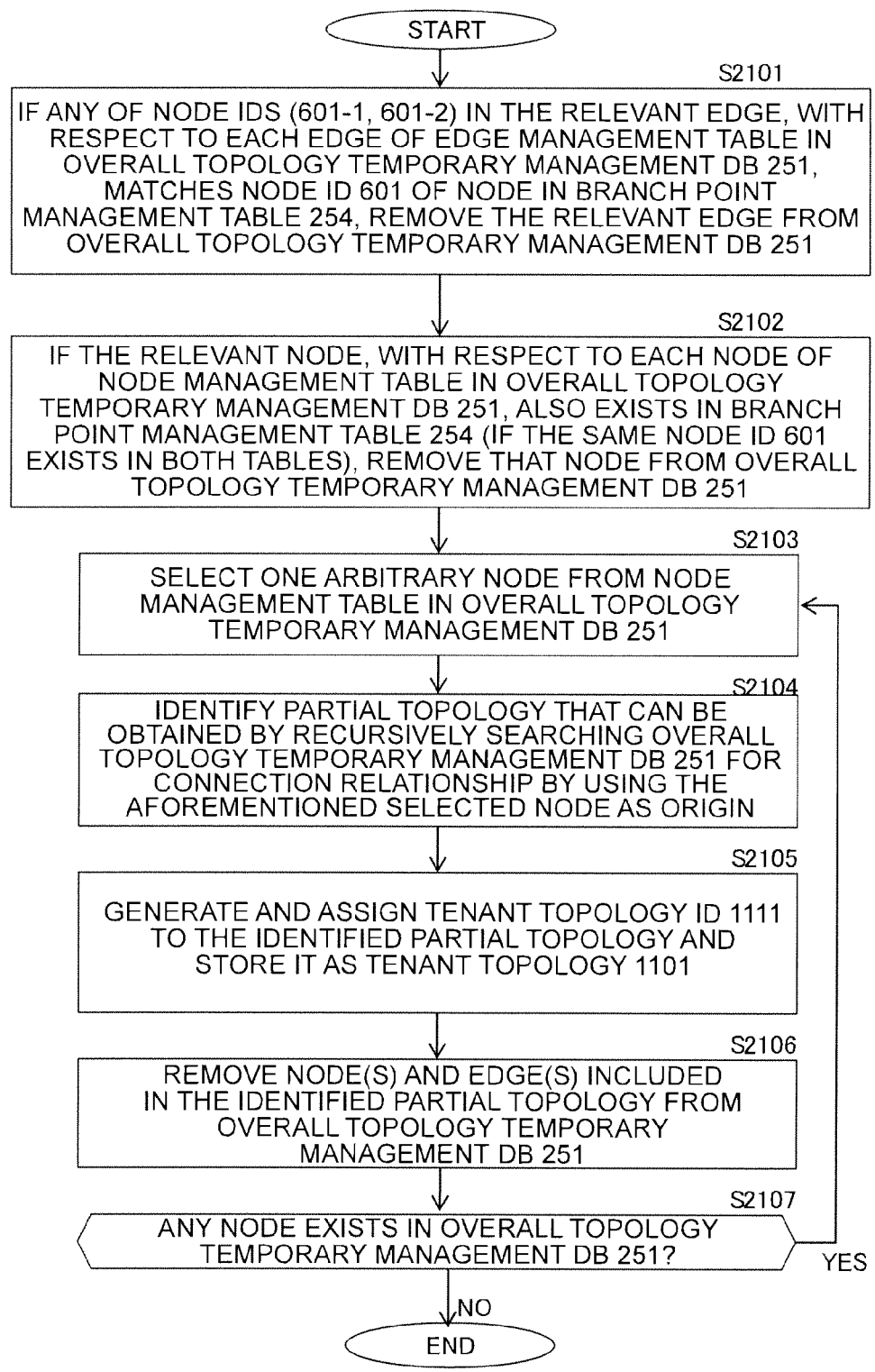
FIG. 21 is an example of a flowchart for explaining tenant topology search processing.

FIG. 21 shows a flow of the tenant topology search processing S1704. Referring to FIG. 21, by means of this processing, the tenant search unit 255 searches the overall topology for individual tenant topologies based on the information of the branch point management table 254 and stores the tenant topology 1101a to 1101c identified by this search as a partial topology or one virtual network topology in the tenant topology management DB 252

Firstly, the branch point node removal unit 271 removes the edge coupled to the branch point node from the overall topology temporary management DB 257 (S2101). Specifically, if any of the node IDs (601-1,601-2) in the relevant edge matches the node ID 601 of a node in the branch point management table 254 with respect to each edge in the edge management table of the overall topology temporary management DB 251, the branch point node removal unit 271 removes that edge from the overall topology temporary management DB 251.

Next, the branch point node removal unit 271 removes the node corresponding to the branch point node from the overall topology temporary management DB 251 (S2102). Specifically, if the relevant node, with respect to each node of the node management table in the overall topology temporary management DB 251, also exists in the branch point management table 254 (if the same node ID 601 exists in both tables), the branch point node removal unit 271 removes that node from the overall topology temporary management DB 251. As a result, the branch point resource (which is the virtual resource mutually coupled to each virtual network and becomes the branch point for each virtual network) will be removed from each virtual network.

The processing for identifying an individual tenant topology from the overall topology will be repeated as follows. The recursive search unit 272 firstly selects one arbitrary node from the node management table in the overall topology temporary management DB 251 (S2103). This node becomes an origin for the recursive search.

Next, the recursive search unit 272 sets the above-described selected node as the search origin for the overall topology temporary management DB 251 and identifies a partial topology which can be obtained by recursively searching for the connection relationship (S2104). Since the branch point node (which is the branch point resource) has been removed in this case, the respective per-tenant virtual networks are in the state of not being coupled to each other. Therefore, a series of nodes obtained by the search can be extracted as a partial topology (or a topology of one virtual network which eventually corresponds to the virtual network for a tenant) by setting an arbitrary node as the search origin and sequentially searching for nodes having the connection relationship with this origin. Furthermore, a plurality of partial topologies (or topologies of a plurality of virtual networks) can be extracted by repeating the processing for selecting another new arbitrary node after extraction of one partial topology, setting the selected node as a new search origin, and sequentially searching for nodes having the connection relationship with this origin. Components of a partial topology include a series of nodes and a series of edges which are obtained by the search. As the search method, any appropriate method may be used such as a width-first search or a depth-first search.

Then, the partial topology identification unit 273 generates and assigns the tenant topology ID 1111 to the identified partial topology and retains it as the tenant topology 1101 (S2105). In this embodiment, the tenant topology ID is a value that sequentially increases from 1; however, any other appropriate methods may be used as long as an ID capable of uniquely identifying the tenant topology can be assigned.

The partial topology identification unit 273 removes the series of nodes and the series of edges, which constitute the tenant topology identified above, from the overall topology temporary management DB 251 (S2106).

Lastly, the recursive search unit 272 judges whether any node exists in the overall topology temporary management DB 251 or not (S2107). If one or more nodes are remaining in the overall topology temporary management DB 251, this means that those nodes have not been searched and are components of unsearched tenants. So, the recursive search unit 272 proceeds to step S2103 and identifies all remaining tenant topologies. On the other hand, if no node is remaining in the overall topology temporary management DB 251, the recursive search unit 272 terminates the processing in this flow. The above-described processing is the flow of the tenant topology search processing S1704.

Incidentally, as shown in a third embodiment, another possible method may be processing for not removing the branch point node from the overall topology and not searching the branch point node during the process of the tenant topology search.

Furthermore, there is actually a case where a virtual resource(s) which is not used by any user (that is, an unused resource) exists; and if the abovementioned processing is applied under this condition, the unused resource may be mistakenly recognized as one of tenant topologies.

Therefore, when removing an unused virtual resource and not treating the unused virtual resource as a tenant topology, there are some methods for extending the tenant search unit 254 in order to identify a virtual resource group related to tenants.

Firstly, there is a method of providing a table for retaining a whatever correspondence relationship between tenant IDs and virtual resources, applying the aforementioned graph search method in accordance with the correspondence relationship retained in that table, and identifying tenants to be used with respect to the remaining virtual resources. For example, there is a method of using a table, which associates virtual LAN nodes and tenant names, setting the aforementioned virtual LAN node in the overall topology as an origin, recursively obtaining nodes to be coupled, recognizing the obtained node group as the same tenant group, and recognizing a virtual resource, which does not belong to any tenant, as an unused resource.

Secondly, there is a method of obtaining setting information indicating a connection relationship between a server and a virtual LAN and recognizing a virtual resource group belonging to a partial topology, which is obtained by a search and is not coupled to the server, as being unused. In the environment including physical servers such as datacenters, this method is effective if an assumption can be made that a server for providing services to tenant topologies exists.

Thirdly, there is a method of recognizing a virtual resource group belonging to the obtained partial topology as being unused when the number of nodes of that partial topology is equal to or more than a certain number. This method is effective in a case where an assumption can be made that an unused resource exists in isolation without being coupled to other virtual resources. Since a partial topology is formed as a combination of one or a small number of unused resources in this case, it is possible to assume that the number of constituent nodes will be smaller than that of a partial topology constituted from used resources; so, the above-described method can be applied. Incidentally, the above-described methods are not exclusive, but may be used in combinations.

Figure 22:
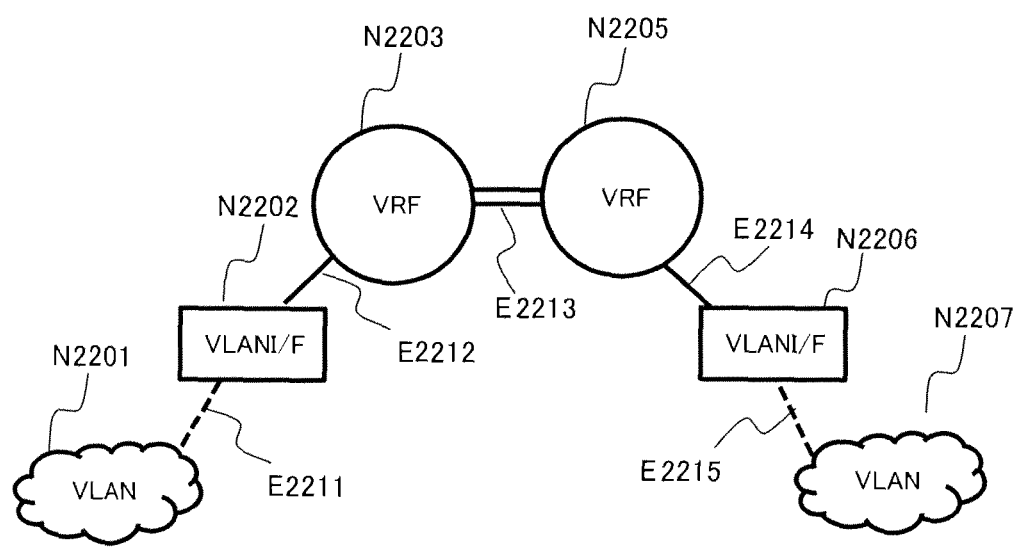
FIG. 22 shows an example of the structure of a logical topology

FIG. 22 is a diagram showing an example of a topology generated by the topology generation processing explained above. Referring to FIG. 22, nodes generated by the config are N2201 to N2207 and generated edges are E2211 to E2215. Node N1 is N2201, N2207, node N2 is N2202, N2206, and node N3 is N2203, N2205. Edge E1 is E2211, E2215 and couples the nodes of the node types N1 and N2. Edge E2 is E2212, E2214 and couples the nodes of the node types N2 and N3. Edge E3 is E2213 and couples two nodes of the node type N3.

Figure 23:
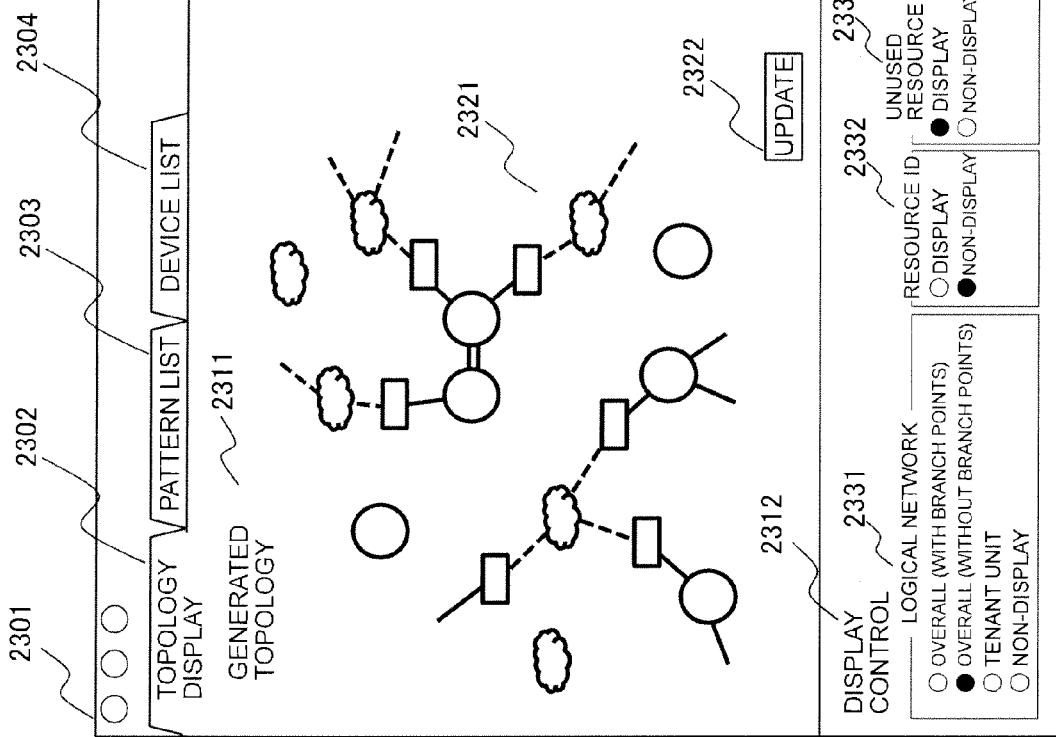
FIG. 23 shows a display example for a tenant topology management screen.

FIG. 23 is an example of a topology generation screen. Referring to FIG. 23, a topology generation screen 2301 is displayed on the console 110. The topology generation screen 2301 includes, for example, a topology display tab 2302 and a pattern list tab 2303.

A series of items for displaying topologies are displayed in the topology display tab 2302. For example, this tab includes a generated topology display area 2311, a display control area 2312, a tenant list area 2313, a tenant resource list area 2314, and a resource search area 2315.

The pattern list tab 2303 displays the node pattern management table 241 and the edge pattern management table 242 corresponding to each device type of the network devices. For example, a node pattern management table and an edge pattern management table with respect to a new device type are added on this screen.

The device list display area 2304 displays a network device list. A display example for the network device list is the network device management table 204. Furthermore, this tab includes a button for registering device information in the network device list, a button for executing collection of the config from the network devices, a button for executing generation of the logical topology information from the collected config, and a button for displaying a generated topology on the screen.

The generated topology display area 2311 displays visualized logical topology information 2321. In this embodiment, a node shape according to the node type and an edge shape according to the edge type are defined and the logical topology information generated from the setting information is visualized. The visualized information changes based on operations in the display control area 2312, the tenant list area 2313, the tenant resource area 2314, and the resource search area 2315 described later. Furthermore, a node in the generated topology display area 2311 may be selected interactively and a tenant to which that node belongs may be highlighted in the tenant list 2313. Incidentally, any appropriate method may be used upon visualization by, for example, omitting displaying of the virtual interface (the node N2) and displaying virtual LANs (node N1) and virtual routers (node N3) by an expression method of directly coupling them.

The display control area 2312 includes a button for designating information to be displayed in the generated topology display area 2311. For example, logical network display methods (2331) include: displaying a virtual network composed of all virtual resources including the tenant branch point; displaying a virtual network composed of virtual resources excluding the tenant branch point; displaying a virtual network for a specific tenant; and displaying only a physical network described later without displaying the virtual resources.

Alternatively, for example, as a resource ID display method (2332), a method of displaying or not displaying the intra-type IDs of nodes and edges of the generated topology area 2311. Furthermore, for example, as a method for displaying the aforementioned unused resources (2333), there is a method of displaying or not displaying the unused resources. An example of the method for identifying the unused resources is as described earlier. Additionally, for example, as a method for displaying the physical device information (2334), a method of explicitly indicating the correspondence relationship between virtual resources and physical devices by utilizing the device IDs of nodes and forming a group of nodes having the same device ID is possible.

The tenant list area 2313 displays a tenant list. In this embodiment, tenant IDs and tenant names are displayed in a table format. When one tenant row is selected, a topology belonging to the relevant tenant may be highlighted from topologies of the generated topology 2311. Incidentally, the tenant name cannot often be obtained from the setting information, but other appropriate methods may be used such as a manual input method by the user via this GUI screen or a method of inputting an external file of a tenant name list. In the case of manual input by the user, a display method of sequentially removing tenants, whose tenant names have already been input, from the generated topology display area 2311 may be used.

The tenant resource area 2314 is an area for a list of virtual resources (nodes) that a specific tenant has. In this embodiment, the node type, the device ID, and the intra-type ID are displayed in a table format and a node list is displayed.

The resource search area 2315 is an area for resource search. Information about the tenant name, the node type, the device ID, and the intra-type ID is used as a key and a node corresponding to this key is searched and displayed on the screen of the search result. For example, the ID of a tenant to which the hit node belongs, the node type of the hit node, the device ID, or the intra-type ID may be displayed in a table format.

Figure 24:
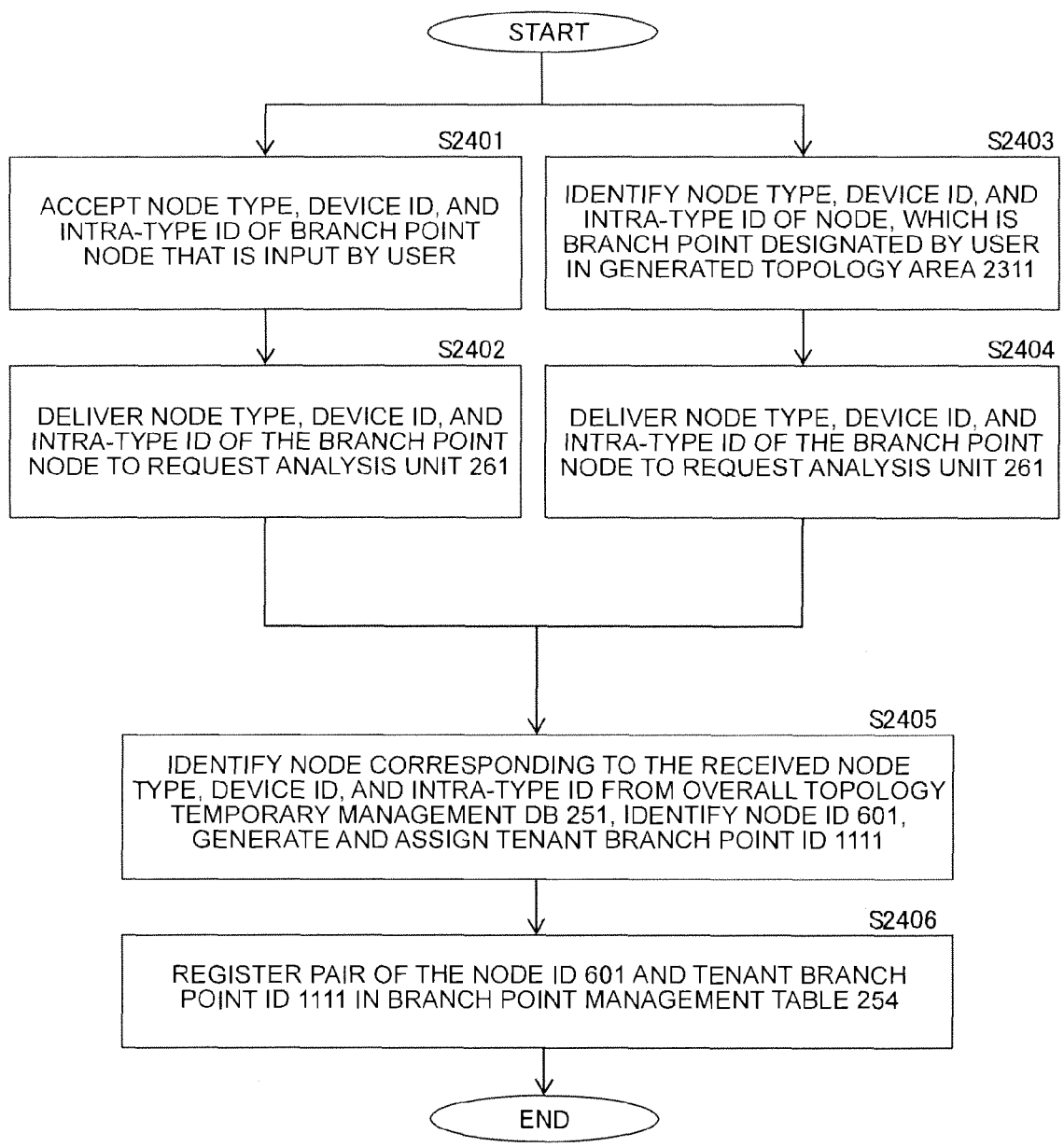
FIG. 24 is an example of a flowchart for explaining tenant branch point designation processing.

FIG. 24 shows a flow of the tenant branch point designation processing. Referring to FIG. 24, this processing is executed by the user, who inputs information about a branch point node to the management server 109 via the console 110, and by the management server 109 which stores the information about that branch point node in the branch point management table 254.

In this embodiment, two methods can be listed as a method for the user to input the branch point node.

Firstly, there is a method of inputting a branch point node designation request to the management request reception unit 203. In this case, the user inputs the branch point node designation request including three parameters, that is, the node type, the device ID, and the intra-type ID of the branch point node (S2401).

Next, the management request reception unit 203 receives the above-mentioned three parameters and delivers them to the request analysis unit (S2402).

Then, the request analysis unit 261 identifies the relevant node in the overall topology temporary management DB 251 based on the three parameters added to the received request, obtains the node ID 601, and generates and assigns the tenant branch point ID 1111 by an appropriate method (S2405).

Lastly, the branch point registration unit 263 registers a pair of the obtained node ID 601 and the tenant branch point ID 1111 in the branch point management table 254 (S2406).

Secondly, there is a method of designating a node, which is displayed in the generated topology area 2311, to the GUI display control unit 221 on the GUI screen.

In this case, the GUI display control unit 221 obtains three parameters, that is, the node type, the device ID, and the intra-type ID with respect to the designated node (S2403).

Next, the GUI display control unit 221 receives the above-mentioned three parameters and delivers them to the request analysis unit (S2404). The subsequent processing is the same as S2405 and S2406. The above-described processing is the flow of the tenant branch point designation processing.

Figure 25:
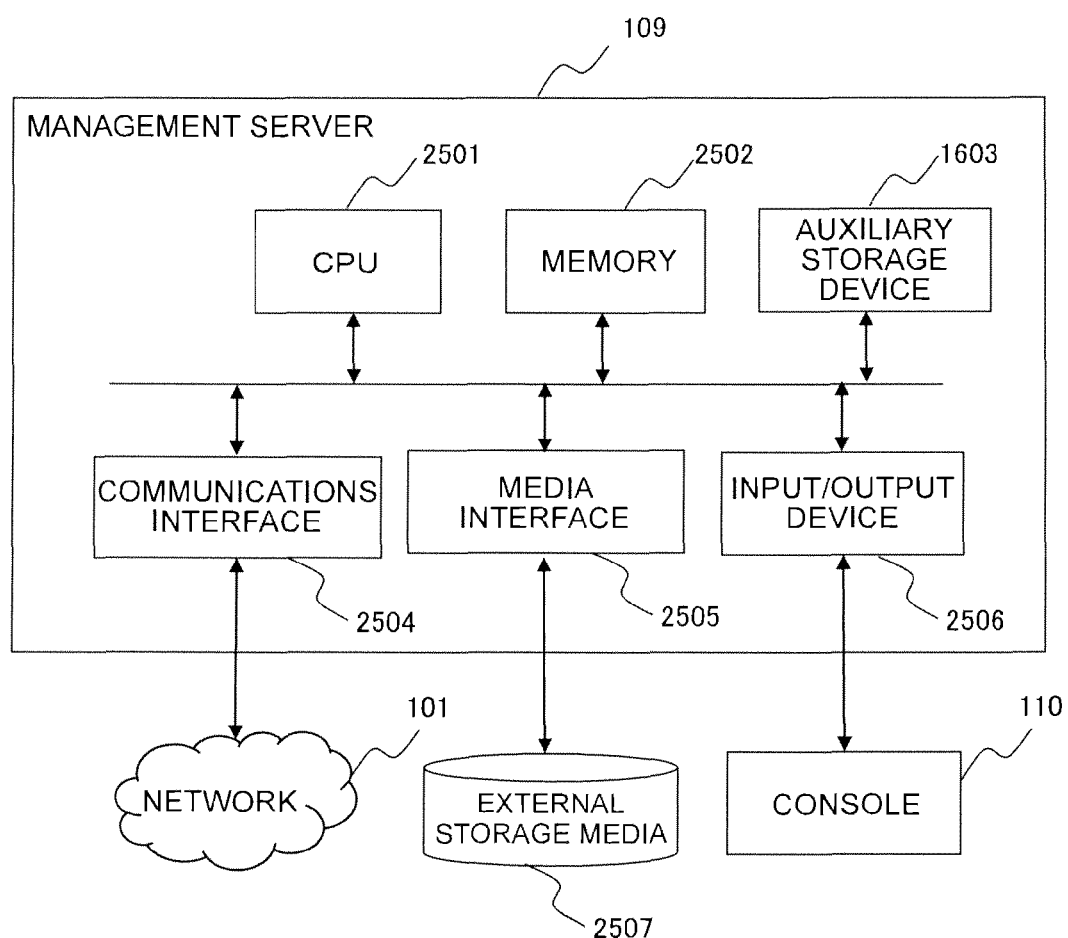
FIG. 25 shows a physical configuration of the management server.

FIG. 25 shows an example of a device configuration of the management server 109. Referring to FIG. 25, the management server 109 can be realized by using a general computer equipped with a CPU 2501, a memory 2502, and an auxiliary storage device 1603. Furthermore, each function constituting each device is embodied on the computer by the CPU executing programs stored in the auxiliary storage device. Each program may be stored in the auxiliary storage device 1603 in the computer in advance. Alternatively, each program may be introduced from another device to the storage device via media that can be used by the computer, through a LAN interface 2504 or a media interface 2505 whenever necessary. The media means, for example, communication media (that is, networks such as wired, wireless, or optical networks, or carrier waves or digital signals propagating over the networks), or external storage media 2507 that can be attached to or detached from the media interface 250. Incidentally, the management server 109 may be coupled to the console 110 which operates the management server via an input/output device 2506.

Under this circumstance, the auxiliary storage device 1603 functions as a storage device for storing logical topology information of all the virtual networks, which is logical topology information of a plurality of virtual networks including a plurality of virtual resources virtually constructed in a plurality of physical devices (such as the firewall 102, the load balancer 103, and the L3 switch) coupled to the network 101. The CPU 2501 manages the logical topology information of all the virtual networks and functions as a controller constituting the config collection unit 201, the topology visualization unit 202, the management request reception unit 203, the overall topology generation unit 207, and the tenant topology identification unit 208. Furthermore, the console 110 functions as a display device for displaying information which is a control target of the controller (CPU 2501) and is designated by the CPU 2501.

In this case, the CPU 2501 can: search the logical topology information of all the virtual networks based on, for example, the branch point resource; extract a series of virtual resources which terminate at the branch point resource; identify the series of extracted virtual resources as a partial network topology or one virtual network; issue an instruction to the console 110 to display information about the identified partial network topology or one virtual network; and issue an instruction to the console 110 to not display information indicating the correspondence relationship between each physical device and the plurality of virtual networks.

In this embodiment, the recursive search unit 272 sets an arbitrary unsearched virtual resource as the search origin and executes the virtual network search processing for recursively and iteratively searching the logical topology information of all the virtual networks, from which the branch point resource has been removed, for a virtual resource which has the connection relationship with the virtual resource serving as the origin. The partial topology identification unit 273 identifies a series of virtual resources, which is obtained by the search by the recursive search unit 272, as one partial network topology.

Under this circumstance, on condition that the partial topology identification unit 273 identifies the series of virtual resources as one partial network topology, the recursive search unit 272 sets an arbitrary unsearched virtual resource, which is different from the arbitrary unsearched virtual resource selected as the origin, as a new search origin and executes virtual network search processing until the search of all virtual resources of all the virtual networks is completed. The partial topology identification unit 273 identifies each series of virtual resources as one of partial network topology every time when a series of virtual resources is obtained by the search by the recursive search unit 272.

In this embodiment, overall logical topology is firstly generated from the setting information and individual tenant topologies are then identified from the overall logical topology. This method is not necessarily mandatory and individual logical topologies may be identified directly from the setting information. Specifically, it is a method of extracting information about any one of virtual resources from the setting information, recursively searching for virtual resources coupled to the relevant virtual resource, and recognizing a set of virtual resources found by the search as one tenant topology.

In this embodiment, three types of nodes are defined as N1, N2, and N3 and a virtual LAN ID, a virtual interface ID, and a virtual router ID are assigned to them as their intra-type IDs. On the other hand, addition of information to the nodes as described below may be useful depending on the configuration of the system constructed at the datacenter 100. In other words, a method of extending the node management table 243 as described below may be useful.

Firstly, there is a method of including not-virtual and physical functional elements. By this method, for example, a physical resource is recognized as one of virtual resources by assigning a virtual LAN number 0 (the number that cannot be set as a virtual LAN) as a physical LAN ID or assigning a virtual router number 0 as a physical router ID. This method is useful for, for example, a system in which physical LANs in addition to virtual LANs, physical interfaces in addition to virtual interfaces, and physical routers in addition to virtual routers function as resources for network communications.

Next, there is a method of attaching IP segment information to a virtual LAN. This method is effective, for example, when one VLAN has a plurality of IP segments and routing is performed in the VLAN. In this case, IP segment information of the virtual LAN is added as the intra-type ID of N1 in addition to the virtual LAN number and an IP address of the relevant interface is added as the intra-type ID of N2 in addition to the virtual interface number. Since the IP segment information is described in the config, it is only necessary to extend the node pattern management table 241 to extract this information.

Then, there is a method of adding physical connection information inside a LAN. When this method is used, it is necessary to newly define the structure of nodes and edges; and they are nodes N1, N2, N3 and edges E0, E1, E2, E3. Node N1 represents a physical interface and nodes N2 and N3 are a virtual interface and a virtual router, respectively, in the same manner as in this embodiment. Edge E0 represents that physical interfaces are coupled to each other via a physical link; edge E1 represents a setting relationship between a physical interface and a virtual interface; and edges E2 and E3 are the same as those in the embodiment. There are three elements that the re-defined node type N1 should have, that is, a node type, a device ID, and a pair of a physical interface ID and a virtual LAN ID as an intra-type ID. If two physical devices are coupled together via a link, two nodes N1 are coupled together via edge E0. If a virtual LAN is assigned to a physical interface, nodes N1 and N2 are coupled together via edge E0. This method is useful in acquiring detailed topologies of a virtual LAN when physical connection information is available.

Lastly, there is a method of including server and storage information. Servers and storage devices can be expressed by using nodes N1, N2, N3 and edges E1, E2, E3 defined in this embodiment. Regarding information about server devices, VM corresponds to node N3, vNIC and vHBA correspond to node N2. Regarding information about storage devices and SAN switch devices, LU and VSAN correspond to node N3, VSAN interfaces and virtual interfaces generated by NPIV correspond to node N2, and zones generated by Zoning correspond to node N1. Association between these functional elements are expressed as edges in the same manner.

Furthermore, nodes and edges which are different from nodes N1, N2, N3 and edges E1, E2, E3 defined in this embodiment may be defined and each of such nodes and edges may be associated with virtualization techniques of the servers and storage devices.

The config of network devices may be MIB (Management Information Base) collected according to SNMP (Simple Network Management Protocol). If this method is used, necessary information for the network device management table 204 includes an SNMP community name. Furthermore, generation patterns of the node pattern management table 241 and connection patterns of the edge pattern management table 242 need to be modified to comply with the MIB format.

According to this embodiment, a logical topology of each virtual network can be identified among logical topologies of a plurality of virtual networks including a plurality of virtual resources virtually constructed in physical devices.

Furthermore, this embodiment can have the following advantageous effects. Even if virtual networks of a plurality of tenants constructed by using a plurality of virtualization techniques share a single physical infrastructure, individual tenant topologies can be acquired promptly and accurately. Furthermore, the difference in skills of individual persons in creating logical topology diagrams can be dissolved and a certain level of quality of the logical topology diagrams can be maintained by visualizing the generated topology information. Furthermore, visualization of the logical topology enables intuitive verification of the accuracy of the config. Furthermore, it is also possible to provide an automatic verification function that automatically guarantees no false connections between tenants. For example, it is possible to verify if the tenants are mistakenly coupled together, by identifying each tenant topology and then further executing recursive search processing. Then, in the environment where a traffic flow rate can be monitored on a virtual resource basis, tenant-based monitoring is possible by associating measured data with the tenant topologies. Alternatively, tenant topology designing skills can be evaluated objectively by calculating structural complexity of the tenant topologies.

Second Embodiment

In the first embodiment, the embodiment judged whether or not there exists a virtual resource (branch point resource), which corresponds to a tenant branch point. To the contrary, if it is known because of a whatever external factor that no branch point exists, the processing for judging the existence of the branch point resource is omitted in a second embodiment; and other components are the same as those of the first embodiment.

Its basic configuration is as explained in the first embodiment; however, in the second embodiment as compared to the first embodiment, the tenant branch point decision unit 253, the branch point management table 254, and the branch point node removal unit 271 are not necessary.

Therefore, the tenant branch point decision processing S1702 is no longer necessary and the branch point node removal processing S2101 and S2102 during the tenant topology search processing (S1704) is also no longer necessary.

In this way, this embodiment can be realized by removing some constituent elements of the first embodiment. Therefore, if it is known that no branch point resource exists, the processing related to the branch point resource can be omitted and the simplified tenant topology identification processing is possible according to this embodiment.

Third Embodiment

In the first embodiment, the branch point resource is removed from the overall topology temporary management DB 251 as preliminary processing before the search when searching tenant topologies; however, other examples of implementation can be possible. Specifically, it is a method of selecting a node to be searched, while avoiding the search of the branch point resource as appropriate, as processing during the search, but not as the preliminary processing before the search, thereby extracting a partial graph successfully searched within a range not including the branch point resource and identifying and managing the extracted partial graph as a tenant topology.

Figure 26:
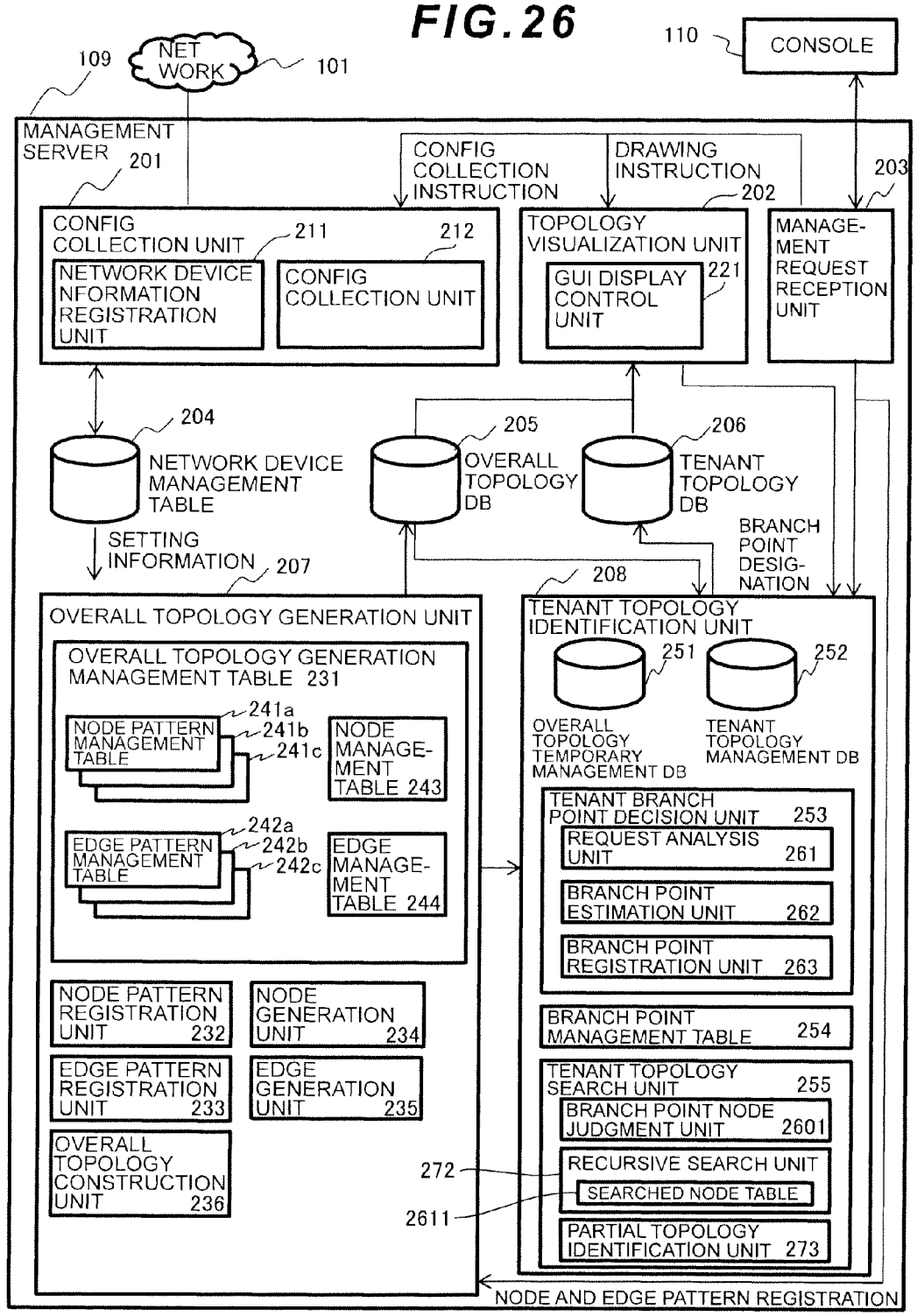
FIG. 26 shows an example of the configuration of a management server according to a third embodiment.

FIG. 26 shows an example of the configuration of the management server 109 that implements this method. Referring to FIG. 26, the management server 109 retains a branch point node judgment unit 2601 and a searched node table 2611 in the tenant topology search unit.

The branch point node judgment unit 2601 judges, during the search processing, whether or not an appropriately selected node matches the branch point node which represents the branch point resource.

The searched node table 2611 is a table for temporarily managing a list of searched nodes during the recursive search processing.

Figure 27:
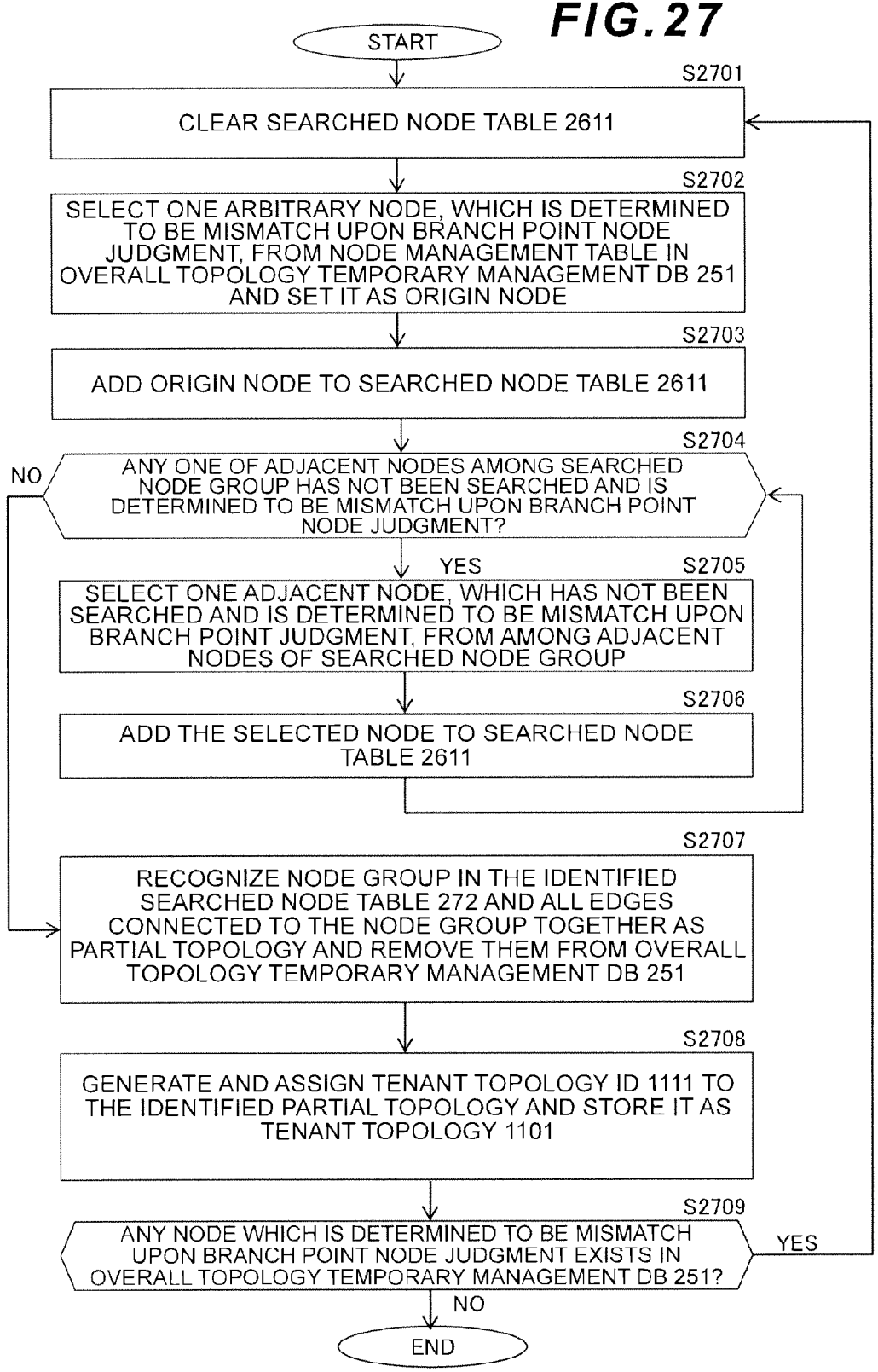
FIG. 27 is an example of a flowchart for explaining tenant topology search processing according to the third embodiment.

FIG. 27 shows a flow of tenant topology search processing S1704 in the third embodiment. Referring to FIG. 27, the recursive search unit 272 firstly clears the searched node table 2611 (S2701).

Next, the recursive search unit 272 selects one arbitrary node, which is determined to be a mismatch upon the branch point node judgment, from the node management table in the overall topology temporary management DB 251 and sets it as an origin node for the search (S2702).

Then, the recursive search unit 272 adds the selected origin node to the searched node table 2611 (S2703).

Figure 28:
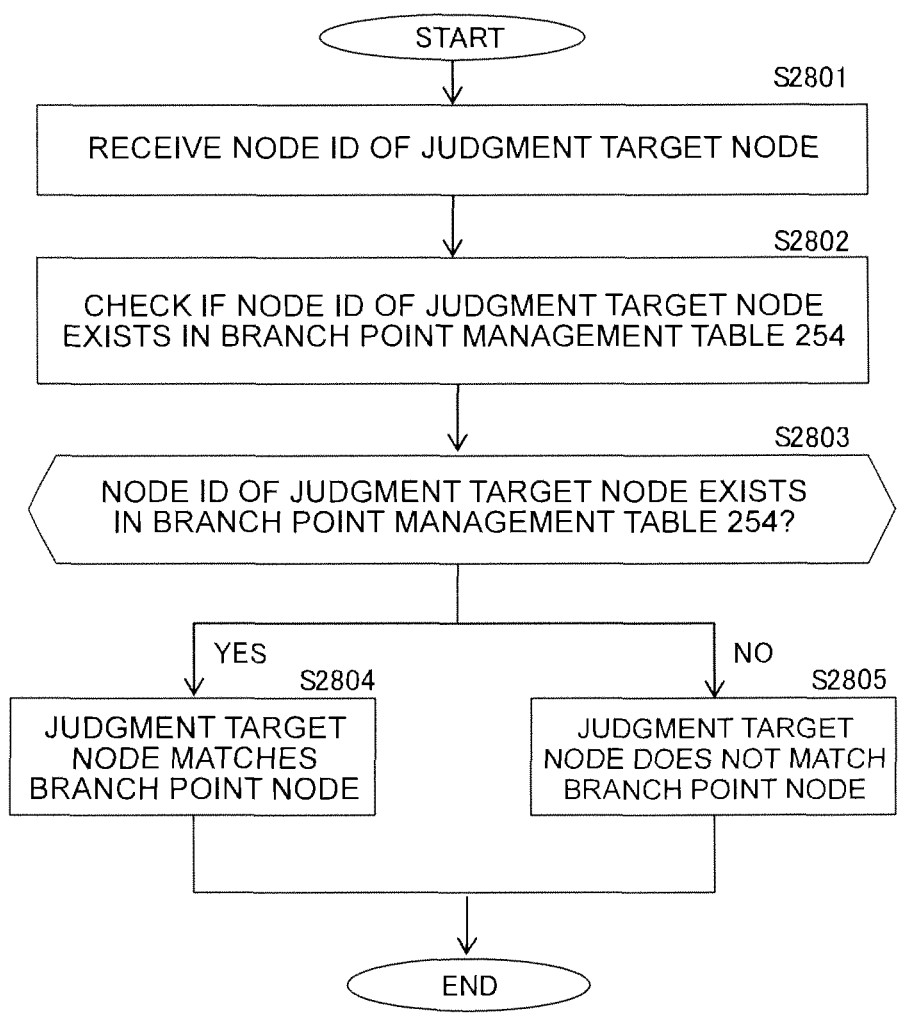
FIG. 28 is an example of a flowchart for explaining branch point node judgment processing.

Subsequently, the recursive search unit 272 executes search processing on one tenant topology. Firstly, the recursive search unit 272 judges whether or not any node, which is determined to be a mismatch upon the branch point node judgment, exists among unsearched nodes, with respect to any adjacent nodes for a searched node group (S2704). If such a node exists, the recursive search unit 272 executes the following processing; and if such a node does not exists, the recursive search unit 272 proceeds to step S2707. The searched nodes are nodes retained in the searched node table 2611. Furthermore, the adjacent node indicates the opposite node coupled to a certain node via an edge and can be identified by referring to the edge management table 244. Incidentally, the details of the branch point node judgment processing are shown in FIG. 28.

Next, the recursive search unit 272 selects one node, which is unsearched and is determined to be a mismatch upon the branch point node judgment, from the adjacent nodes for the searched node group (S2705).

Then, the recursive search unit 272 adds the selected node to the searched node table (S2706). Subsequently, the recursive search unit 272 repeats this processing until the completion of the search of all the nodes coupled to each other by returning to the processing in S2704.

After identifying all the nodes which can be reached with respect to the origin node by tracing the connection relationship, the partial topology identification unit 273 combines the node groups in the identified searched node table 272 with all the edges coupled to these node groups, recognizes the resultant combination as a partial topology constituting a tenant, and removes it from the overall topology temporary management DB 251 (S2707).

Then, the partial topology identification unit 273 generates the tenant topology ID 1111 for the partial topology identified above, assigns the generated tenant topology ID 1111 to the identified partial topology, and stores the identified partial topology as a tenant topology 1101 (S2708). In this embodiment, the value of the ID is a value that sequentially increases from 1; however, any ID may be assigned as long as the ID is capable of uniquely identifying the tenant topology.

Lastly, the partial topology identification unit 273 judges whether or not any node, which is determined to be a mismatch upon the branch point node judgment, exists in the overall topology temporary management DB 251 (S2709). If such a node exists, the partial topology identification unit 273 proceeds to step S2701 and executes the processing for identifying a tenant which has not been identified; and if such a node does not exist, the partial topology identification unit 273 terminates the processing in this flow. The above-described processing is the flow of the tenant topology search processing 1704 according to the third embodiment.

FIG. 28 shows a flow of the branch point node judgment processing. Referring to FIG. 28, by means of this processing, the branch point node judgment unit 2601 judges whether a judgment target node is a branch point node or not.

Firstly, the branch point node judgment unit 2601 receives the node ID of the judgment target node (S2801).

Next, the branch point node judgment unit 2601 checks if the node ID of the judgment target node exists in the branch point management table 254 (S2802).

The branch point node judgment unit 2601 judges whether the judgment target node exists in the branch point management table 254 or not (S2803). If the branch point node judgment unit 2601 determines that the judgment target node exists in the branch point management table 254, it returns a judgment indicating that the judgment target node matches the branch point node, and then terminates the processing (S2804).

On the other hand, if the branch point node judgment unit 2601 determines that the judgment target node does not exist in the branch point management table, it returns a judgment indicating that the judgment target node does not match the branch point node, and then terminates the processing (S2805). The above-described processing is the flow of the branch point node judgment processing.

In this embodiment, the recursive search unit 272 sets an arbitrary unsearched virtual resource as the search origin and executes the virtual network search processing for recursively and iteratively searching the logical topology information of all the virtual networks for a virtual resource which has the connection relationship with the virtual resource serving as the origin and is different from the branch point resource. The partial topology identification unit 273 identifies a series of virtual resources, which are obtained by the search by the recursive search unit 272, as one partial network topology.

Under this circumstance, on condition that the partial topology identification unit 273 identifies the series of virtual resources as one partial network topology, the recursive search unit 272 sets an arbitrary unsearched virtual resource (which is a virtual resource different from the arbitrary unsearched virtual resource selected as the origin) as a new search origin, and this search unit executes the virtual network search processing until it completes the search of all virtual resources (which are different from the branch point resource) for all the per-tenant virtual networks. Every time a series of virtual resources is obtained by the search by the recursive search unit 272, the partial topology identification unit 273 identifies each series of virtual resources as one partial network topology (which eventually corresponds to the virtual network for a tenant).

According to this embodiment, the branch point resource is removed from the search target when searching the virtual resources, so that the tenant branch point decision processing and the branch point node removal processing are no longer necessary and the tenant topology identification processing can be simplified more than the first embodiment.

Fourth Embodiment

The aforementioned embodiments have described examples of identifying tenant topologies. This embodiment will further describe an example of identifying, grouping, and managing tenant topologies having similar structures from the identified tenant topologies. To identify similar tenant topologies is effective in, for example, quantitatively acquiring the tendency of a typical tenant topology.

Figure 29:
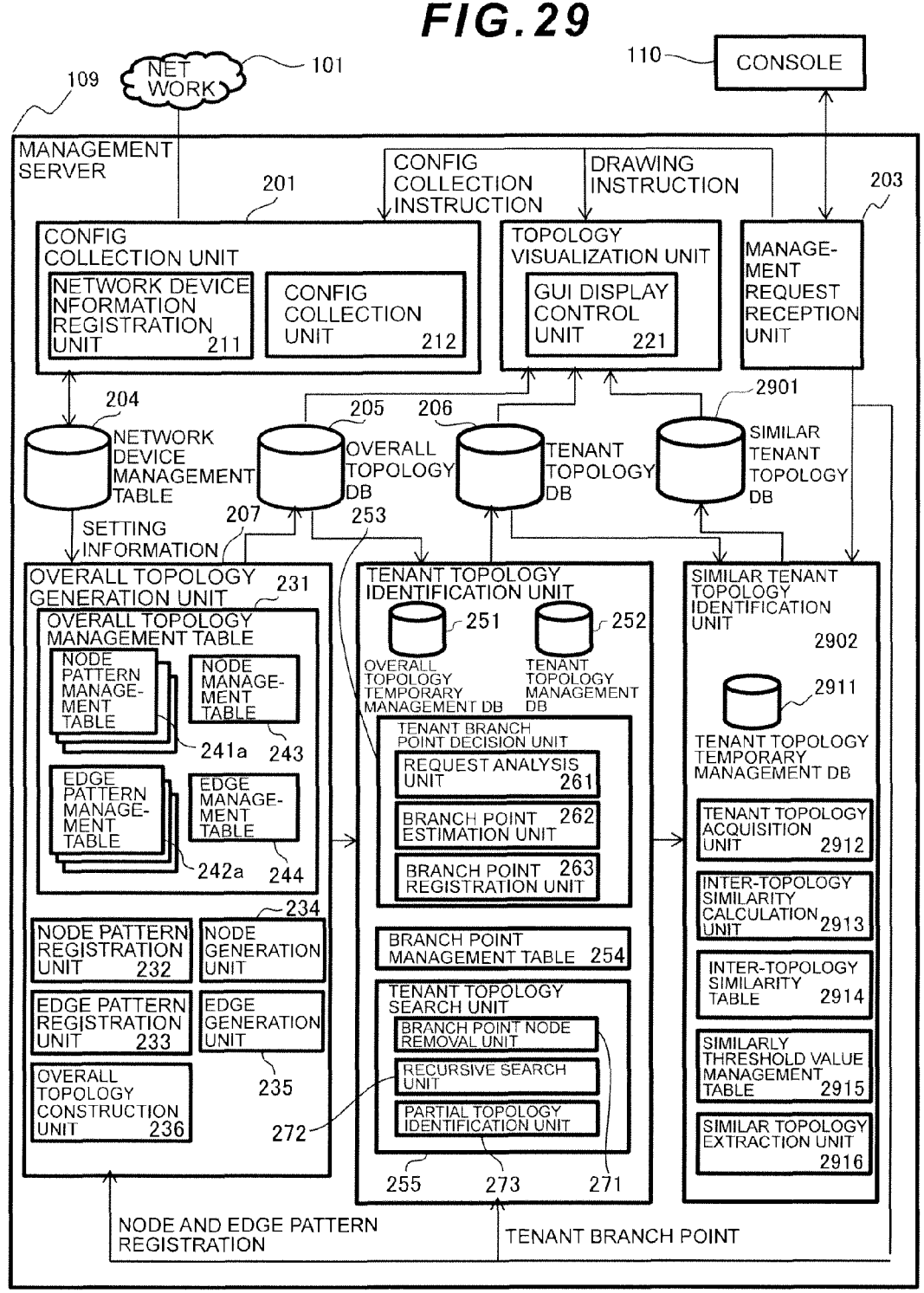
FIG. 29 shows an example of the configuration of a management server according to a fourth embodiment.

FIG. 29 shows an example of the structure of the management server 109 for identifying similar tenant topologies. Referring to FIG. 29, in this embodiment, a similar tenant topology DB 2901 and a similar tenant topology identification unit 2902 are added to the management server 109 described in the first embodiment.

Figure 30:
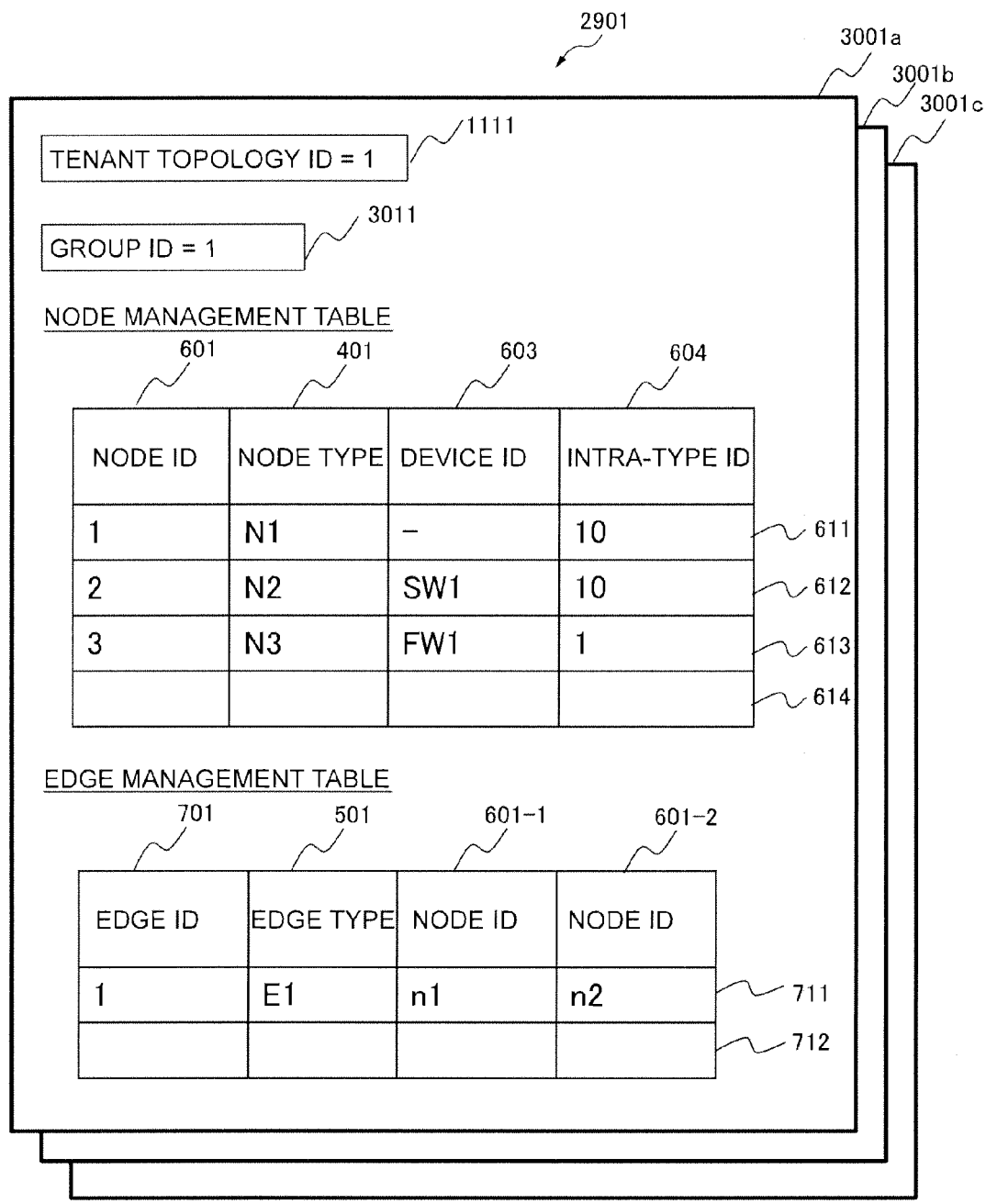
FIG. 30 shows an example of the structure of a similar tenant topology DB.

The similar tenant topology DB 2901 retains similar tenant information identified by the similar tenant topology identification unit 2902. The structure of the similar tenant topology DB 2901 is as shown in FIG. 30 and is basically the same as that of the tenant topology DB 205; however, the difference between the similar tenant topology DB 2901 and the tenant topology DB 205 is that a group ID 3011 is newly added. Tenant topologies having the same group ID means that they are similar to each other.

The similar tenant topology identification unit 2902 identifies tenants of similar topologies from the tenant topology DB 206 and stores it in the similar tenant topology DB 2901. In order to identify similar tenant topologies, similarity between tenant topologies is calculated quantitatively and a set of tenant topologies with high mutual similarity is identified. For this purpose, the similar tenant topology identification unit 2902 includes, as its elements, a tenant topology temporary management DB 2911, a tenant topology acquisition unit 2912, an inter-topology similarity calculation unit 2913, an inter-topology similarity table 2914, a similarity threshold value management table 2915, and a similar topology extraction unit 2916.

The tenant topology temporary management DB 2911 is a DB for temporarily retaining tenant topologies. Its structure is the same as that of the similar tenant topology DB 2091.

The tenant topology acquisition unit 2912 obtains a tenant topology list from the tenant topology DB 206 and stores it in the tenant topology temporary management DB 2911.

The inter-topology similarity calculation unit 2913 is a functional unit that calculates similarity between tenant topologies. The inter-topology similarity calculation unit 2913 calculates a similarity matrix, using the tenant topology list as an input; and then stores it in the inter-topology similarity table 2914. Elements of the similarity matrix are similarity between two tenant topologies.

The inter-topology similarity table 2914 retains the similarity between tenant topologies. An example of the structure of this table is shown in FIG. 31.

Figure 31:
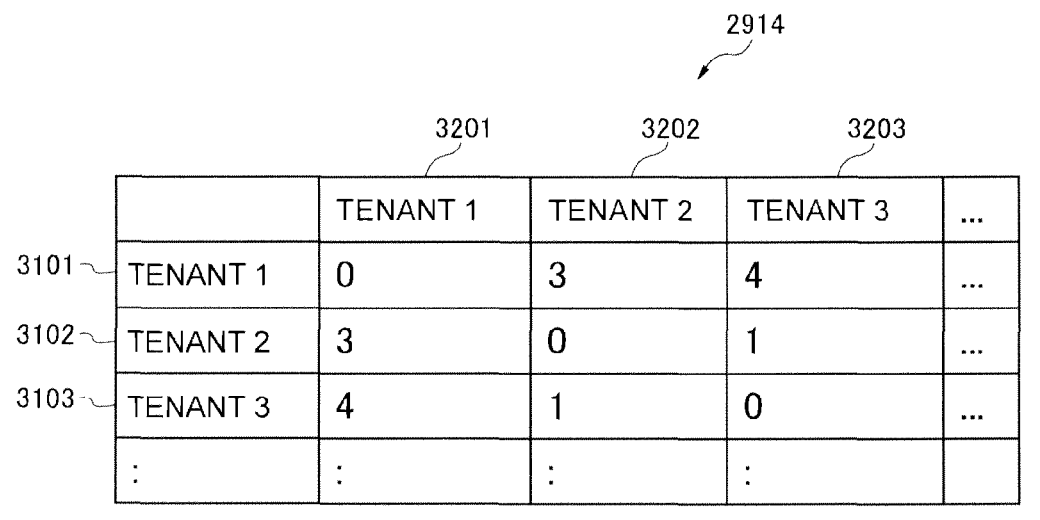

Referring to FIG. 31, the inter-topology similarity table 2914 is a table showing the similarity matrix between tenant topologies and is constituted from tenant topology rows 3101 to 3103, and so on and tenant topology columns 3201 to 3203, and so on. Both rows and columns represent tenant topologies. For example, row i represents the i-th tenant topology and column j represents the j-th tenant topology. An element of row i and column j represents the similarity between the i-th and j-th tenant topologies. When the similarity is 0, it means that both topologies have the same structure; and as the number increases, it means that the difference between these topologies is large. This similarity is calculated according to, for example, a graph edit distance described later. Incidentally, this table structure is not mandatory and any other appropriate formats may be used as long as the similarity between arbitrary tenant topologies is retained.

The similarity threshold value management table 2915 retains a threshold value (reference value) for judging similar topologies. The structure of this table depends on a cluster analysis method described later and may often retain only one number. This threshold value may be input, for example, by the user via the management request reception unit 203 or a constant may be retained in advance.

The similar topology extraction unit 2916 is a functional unit for identifying a set of tenant topologies having high mutual similarity. The similar topology extraction unit 2916 calculates the sum of similar tenant topologies by using the inter-topology similarity table 2914 as an input and then outputs the calculated sum.

FIG. 32 shows a flow of the similar tenant topology identification processing. Referring to FIG. 32, the tenant topology acquisition unit 2912 firstly obtains the tenant topology list from the tenant topology DB 206 and stores it in the tenant topology temporary management DB 2911 (S3201). At this point, no value is input to the group ID 3011 in the tenant topology temporary management DB 2911.

Next, the inter-topology similarity calculation unit 2913 calculates the similarity between all combinations of topologies and stores the calculation results as the similarity matrix in the inter-topology similarity table 2914 (S3202). The similarity between the tenant topologies is calculated as a graph edit distance which can be calculated by using a known method.

Then, the similar topology extraction unit 2916 inputs the similarity matrix of the inter-topology similarity table 2914 and the similarity threshold value management table 2915, applies the existing cluster analysis method, and extracts and outputs a group of similar tenant topologies (S3203).

Next, the similar topology extraction unit 2916 assigns the same value to the group ID 3011 for the tenant topology temporary management DB 2911 with respect to each tenant topology in the same group (S3204).

Lastly, the similar topology extraction unit 2916 stores the tenant topology temporary management DB 2911 in the similar tenant topology DB 2901 (S3205) and terminates the processing in this routine. The above-described processing is the flow of the similar tenant topology identification processing.

Regarding the processing S3023, the graph edit distance between two graphs is a minimum number of times of operations when graph operations to add and/or delete nodes and edges are performed on one graph to make it isomorphic to the other graph. To be isomorphic means that two graphs have the same structure. In other words, the connection relationship between nodes and edges of one graph is maintained, while the respective nodes of both the graphs can be mapped to each other one-on-one.

The graph edit distance between two graphs can be calculated by a known method. In this example of identifying the similar tenant topologies, a method capable of mapping only when the node types of both nodes match is used for mapping between the nodes. By this method, for example, mapping between two virtual LAN nodes is permitted, but mapping between a virtual LAN node and a virtual router node is not permitted.

Regarding the processing S3204, the existing cluster analysis method may be used to identify similar components from the similarity matrix. Examples of the cluster analysis method include hierarchical clustering and K-means method. These methods are to group mutually similar components, assign a group ID to them, and output them. All the input components belong to any of groups. The group ID generated by these methods will be assigned as the group ID 3011.

One example of the cluster analysis is as follows. Firstly, a threshold value is obtained from the similarity threshold value management table 2915. The value of this threshold value is defined as T. Next, reference is made to the inter-topology similarity table 2914 and a series of tenant topologies whose mutual similarity is T or lower is extracted. For example, in a case of T=0, a set of completely matching graphs is extracted. Next, the group ID 3011 is generated and assigned to the series of extracted tenant topologies. Any value may be used as the group ID as long as it can identify the extracted group. Then, this extraction processing is repeated until it is applied to all the tenant topologies. As a result of these operations, similar tenant topologies can be extracted. Because of the above-described structure, the similar tenant topologies can be identified.

Although the graph edit distance is used as the similarity in the above-described embodiment, whether the graphs are isomorphic to each other or not may be used as the similarity. Specifically, for example, if two graphs are isomorphic, the similarity may be set to 1; and if the two graphs are not isomorphic, the similarity may be set to 0. This similarity can be calculated by an existing method.

Incidentally, regarding mapping between nodes upon the graph isomorphic judgment, mapping is permitted if the node types match in this embodiment; however, any other appropriate methods may be used. For example, a method of permitting mapping when the node types and the device IDs match when performing mapping may be used.

According to this embodiment, similar tenant topologies can be identified among the respective tenant topologies.

Incidentally, various variations of the aforementioned embodiments are feasible. Part of the configuration of a certain embodiment can be replaced with the configuration of another embodiment and the configuration of another embodiment can be added to the configuration of a certain embodiment. Also, part of the configuration of each embodiment can be added to, or deleted, or replaced with, the configuration of another configuration.

Furthermore, a part or whole of each of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

Although the present disclosure has been described with reference to example embodiments, those skilled in the art will recognize that various changes and modifications may be made in form and detail without departing from the spirit and scope of the claimed subject matter.

We claim:

1. A management server comprising:
a storage device storing logical topology information of a plurality of virtual networks including a plurality of virtual resources virtually constructed in a plurality of physical devices coupled to a network, which is logical topology information of the virtual networks; and
a controller configured to manage the logical topology information of the virtual networks;
wherein the controller is configured to judge, based on the logical topology information of the virtual networks, whether or not a branch point resource which is a virtual resource for coupling the plurality of virtual networks and constitutes a branch point for each virtual network exists in the virtual networks, and
in response to a judgment result that the branch point resource exists, the controller is configured to search the logical topology information of each of the virtual networks, extract a series of virtual resources that terminates at the branch point resource, and identify the series of extracted virtual resources as a partial topology, which represents the logical topology of a virtual network inside the virtual networks;
wherein the controller includes a branch point decision unit configured to judge whether the branch point resource exists or not, based on the logical topology information of the virtual networks; and
wherein the branch point decision unit includes at least one of:
a request analysis unit configured to, upon receipt of a request designating the branch point resource, analyze information added to the request and extract the branch point resource from the logical topology information of the virtual networks; and
a branch point estimation unit configured to extract a specific virtual resource from the logical topology information of the virtual networks based on degree information, which is information indicating a connection relationship between the virtual resources existing in each virtual network and indicating the number of connections with other virtual resources, and estimate an extracted virtual resource as a branch point resource.

2. The management server according to claim 1, wherein the controller includes:
a topology search unit configured to search the logical topology information of the virtual networks and identify a series of virtual resources that terminates at the branch point resource, as one partial topology;
a branch point management table configured to manage the branch point resource of each virtual network; and
a branch point registration unit configured to register the branch point resource in the branch point management table;
wherein the topology search unit includes:
a branch point removal unit configured to remove the branch point resource from the logical topology information of the virtual networks;
a recursive search unit configured to set an arbitrary unsearched virtual resource as a search origin and execute virtual network search processing for recursively or iteratively searching for a series of virtual resources having a connection relationship with the virtual resource serving as the origin from the logical topology information of the virtual networks, from which the branch point resource is removed; and a partial topology identification unit configured to identify a series of virtual resources obtained by the search by the recursive search unit as one partial topology;

wherein on condition that the partial topology identification unit identifies the series of searched virtual resources as one partial topology, the recursive search unit is configured to set an arbitrary unsearched virtual resource as a new search origin and execute the virtual network search processing until the search of all search target virtual resources in the virtual networks is completed; and wherein every time a series of virtual resources is obtained by the search by the recursive search unit, the partial topology identification unit is configured to identify each series of virtual resources as one partial topology, which represents the logical topology of a virtual network inside the virtual networks.

3. The management server according to claim 1, wherein the controller includes:

a topology search unit configured to search the logical topology information of the virtual networks and identify a series of virtual resources that terminates at the branch point resource, as one partial topology;

a branch point management table configured to manage the branch point resource of virtual network; and a branch point registration unit configured to register the branch point resource in the branch point management table;

wherein the topology search unit includes:

a recursive search unit configured to set an arbitrary unsearched virtual resource as a search origin and execute virtual network search processing for recursively or iteratively searching for a virtual resource, which has a connection relationship with the virtual resource serving as the origin and is different from the branch point resource, from the logical topology information of the virtual networks; and a partial topology identification unit configured to identify a series of virtual resources obtained by the search by the recursive search unit as one partial topology;

wherein on condition that the partial topology identification unit identifies the series of searched virtual resources as one partial topology, the recursive search unit is configured to set an arbitrary unsearched virtual resource as a new search origin and execute the virtual network search processing until the search of all search target virtual resources, which are different from the branch point resource, among the virtual resources of the virtual networks is completed; and wherein every time a series of virtual resources is obtained by the search by the recursive search unit, the partial topology identification unit is configured to identify each series of virtual resources as one partial topology, which represents the logical topology of a virtual network inside the virtual networks.

4. The management server according to claim 1, wherein the controller includes:

a topology temporary management database configured to temporarily retain and manage the logical topology information of the virtual networks; and a partial topology management database configured to retain and manage information about the identified partial topology.

5. The management server according to claim 4, wherein the controller includes:

a node pattern management table for managing a node type indicating a type of the virtual resource and a generation pattern regarding generation of the virtual resource;

an edge pattern management table for managing an edge type indicating a type of an edge for mutually coupling a plurality of virtual resources, a connection node type indicating a type of the virtual resources coupled to both ends of the edge, and a connection pattern regarding connection between the virtual resources; and a topology generation unit configured to refer to the node pattern management table and the edge pattern management table based on setting information of the physical devices, generate virtual resource information and inter-virtual-resource connection information corresponding to the virtual resources, and generate the logical topology information of the virtual networks from the generated virtual resource information and inter-virtual-resource connection information.

6. The management server according to claim 5, wherein each virtual network is constructed with a plurality of types of virtualization techniques;

wherein the virtual resource information includes a node type indicating a type of the virtual resource, a device ID of a physical device, in which the virtual resource virtually exists, and an intra-type ID for uniquely identifying the virtual resource in the virtual network; and wherein the inter-virtual-resource connection information includes an edge type indicating a type of an edge for mutually coupling a plurality of virtual resources existing in the virtual network and a plurality of node IDs for uniquely identifying two virtual resources coupled to both ends of the edge in the virtual network.

7. The management server according to claim 6, wherein the plurality of types of virtualization techniques to virtualize a network device among the physical devices are configured by using two or more of a virtual LAN technique, a virtual interface technique, and a virtual router technique.

8. The management server according to claim 1, wherein the controller is a controller configured to control a display device, and the controller is configured to search the logical topology information of the virtual networks based on the branch point resource constituting the branch point of the virtual network, extract a series of virtual resources that terminates at the branch point resource, identify the series of extracted virtual resources as a partial topology, issue an instruction to the display device to display information about the identified partial topology, and issue an instruction to the display device to not display information indicating a correspondence relationship between the physical devices and the virtual networks.

9. A management method for a management server which includes a storage device storing logical topology information of a plurality of virtual networks including a plurality of virtual resources virtually constructed in a plurality of physical devices coupled to a network, which is logical topology information of the virtual networks, and a controller for managing the logical topology information of the virtual networks, the method comprising:

judging, by the controller, based on the logical topology information of the virtual networks, whether or not a branch point resource which is a virtual resource for mutually coupling the plurality of virtual networks and constitutes a branch point for each virtual network exists in the virtual resources of the virtual networks;

searching, by the controller, the logical topology information of the virtual networks and extracting, by the controller, a series of virtual resources that terminates at the branch point resource in response to a judgment result that the branch point resource exists; and identifying, by the controller, the series of extracted virtual resources as a partial topology, and wherein the controller includes a branch point decision unit for judging whether the branch point resource exists or not, based on the logical topology information of the virtual networks; and wherein the branch point decision unit includes at least one of:

a request analysis unit for, upon receipt of a request designating the branch point resource, analyzing information added to the request and extracting the branch point resource from the logical topology information of the virtual networks; and a branch point estimation unit for extracting a specific virtual resource from the logical topology information of the virtual networks based on degree information, which is information indicating a connection relationship between the virtual resources existing in each virtual network and indicating the number of connections with other virtual resources, and estimating an extracted virtual resource as a branch point resource.

10. The management method according to claim 9, wherein the controller includes:

a topology search unit for searching the logical topology information of the virtual networks and identifying a series of virtual resources that terminates at the branch point resource, as one partial topology;

a branch point management table for managing the branch point resource of each virtual network; and a branch point registration unit for registering the branch point resource in the branch point management table;

wherein the topology search unit includes:

a branch point removal unit for removing the branch point resource from the logical topology information of the virtual networks;

a recursive search unit for setting an arbitrary unsearched virtual resource as a search origin and executing virtual network search processing for recursively or iteratively searching for a virtual resource having a connection relationship with the virtual resource serving as the origin from the logical topology information of the virtual networks, from which the branch point resource is removed; and a partial topology identification unit for identifying a series of virtual resources obtained by the search by the recursive search unit as one partial topology;

wherein on condition that the partial topology identification unit identifies the series of virtual resources as one partial topology, the recursive search unit executes a step of setting an arbitrary unsearched virtual resource, as a new search origin and executing the virtual network search processing until the search of all search target virtual resources in the virtual networks is completed; and wherein every time a series of virtual resources is obtained by the search by the recursive search unit, the partial topology identification unit executes a step of identifying each series of virtual resources as one partial topology, which represents the logical topology of a virtual network inside the virtual networks.

11. The management method according to claim 9, wherein the controller includes:

a topology search unit for searching the logical topology information of the virtual networks and identifying a series of virtual resources that terminates at the branch point resource, as one partial topology;

a branch point management table for managing the branch point resource of each virtual network; and a branch point registration unit for registering the branch point resource in the branch point management table;

wherein the topology search unit includes:

a recursive search unit for setting an arbitrary unsearched virtual resource as a search origin and executing virtual network search processing for recursively or iteratively searching for a virtual resource, which has a connection relationship with the virtual resource serving as the origin and is different from the branch point resource, from the logical topology information of the virtual networks; and a partial topology identification unit for identifying a series of virtual resources obtained by the search by the recursive search unit as one partial topology;

wherein on condition that the partial topology identification unit identifies the series of searched virtual resources as one partial topology, the recursive search unit executes a step of setting an arbitrary unsearched virtual resource as a new search origin and executing the virtual network search processing until the search of all search target virtual resources, which are different from the branch point resource, among the virtual resources of the virtual networks is completed; and wherein every time a series of virtual resources is obtained by the search by the recursive search unit, the partial topology identification unit executes a step of identifying each series of searched virtual resources as one partial topology, which represents the logical topology of a virtual network inside the virtual networks.

12. The management method according to claim 9, wherein the controller includes:

a topology temporary management database for temporarily retaining and managing the logical topology information of the virtual networks; and a partial topology management database for retaining and managing information about the identified partial topology.

13. The management method according to claim 12, wherein the controller includes:

a node pattern management table for managing a node type indicating a type of the virtual resource and a generation pattern regarding generation of the virtual resource;

an edge pattern management table for managing an edge type indicating a type of an edge for mutually coupling a plurality of virtual resources, a connection node type indicating a type of the virtual resources coupled to both ends of the edge, and a connection pattern regarding connection between the virtual resources; and a topology generation unit for referring to the node pattern management table and the edge pattern management table based on setting information of the physical devices, generating virtual resource information and inter-virtual-resource connection information corresponding to the virtual resources, and generating the logical topology information of the virtual networks from the generated virtual resource information and inter-virtual-resource connection information.

14. The management method according to claim 13, wherein each virtual network is constructed by a plurality of types of virtualization techniques;

wherein the virtual resource information includes a node type indicating a type of the virtual resource, a device ID of a physical device, in which the virtual resource virtually exists, and an intra-type ID for uniquely identifying the virtual resource in the virtual network; and wherein the inter-virtual-resource connection information includes an edge type indicating a type of an edge for mutually coupling a plurality of virtual resources existing in the virtual network and a plurality of node IDs for uniquely identifying two virtual resources coupled to both ends of the edge in the virtual network.

15. The management method according to claim 14, wherein the plurality of types of virtualization techniques to virtualize a network device among the physical devices and are configured by using two or more of a virtual LAN technique, a virtual interface technique, and a virtual router technique.

16. A management method for a management server which includes a storage device storing logical topology information of a plurality of virtual networks including a plurality of virtual resources virtually constructed in a plurality of physical devices coupled to a network, which is logical topology information of the virtual networks, and a controller for managing the logical topology information of the virtual networks, the method comprising:

judging, by the controller, based on the logical topology information of the virtual networks, whether or not a branch point resource which is a virtual resource for mutually coupling the plurality of virtual networks and constitutes a branch point for each virtual network exists in the virtual resources of the virtual networks;

searching, by the controller, the logical topology information of the virtual networks and extracting, by the controller, a series of virtual resources that terminates at the branch point resource in response to a judgment result that the branch point resource exists; and identifying, by the controller, the series of extracted virtual resources as a partial topology, wherein the controller is a controller for controlling a display device; and the method further comprising:

searching, by the controller, the logical topology information of the virtual networks based on the branch point resource constituting the branch point of the virtual network and extracting, by the controller, a series of virtual resources that terminates at the branch point resource; and identifying, by the controller, the series of virtual resources, which was extracted in the above extracting step, as a partial topology, issuing, by the controller, an instruction to the display device to display information about the identified partial topology, and issuing, by the controller, an instruction to the display device to not display information indicating a correspondence relationship between the physical devices and the virtual networks.

* * * * *